(12) United States Patent
Walbeck et al.

(10) Patent No.: US 7,401,120 B2
(45) Date of Patent: Jul. 15, 2008

(54) METHOD AND APPARATUS FOR UNIVERSAL DATA EXCHANGE GATEWAY

(75) Inventors: Alan K. Walbeck, Sandy, UT (US); Thomas N. Lee, Spanish Fork, UT (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

(21) Appl. No.: 11/478,504

(22) Filed: Jun. 29, 2006

(65) Prior Publication Data
US 2006/0248208 A1 Nov. 2, 2006

Related U.S. Application Data

(63) Continuation of application No. 09/235,084, filed on Jan. 21, 1999.

(60) Provisional application No. 60/072,128, filed on Jan. 22, 1998.

(51) Int. Cl.
*G06F 15/16* (2006.01)

(52) U.S. Cl. ........................ 709/203; 709/220; 709/224; 713/300

(58) Field of Classification Search ................. 709/224, 709/227, 228, 238, 203, 219, 229; 707/202; 713/300
See application file for complete search history.

(56) References Cited

U.S. PATENT DOCUMENTS

| | | | |
|---|---|---|---|
| 4,853,843 A | 8/1989 | Ecklund | |
| 5,371,852 A | 12/1994 | Attanasio et al. | |
| 5,550,906 A * | 8/1996 | Chau et al. | ............. 379/201.05 |
| 5,608,720 A | 3/1997 | Biegel et al. | |
| 5,630,116 A | 5/1997 | Fung | |
| 5,630,204 A | 5/1997 | Hylton et al. | |
| 5,640,446 A | 6/1997 | Everett et al. | |
| 5,668,986 A | 9/1997 | Nilsen et al. | |
| 5,742,774 A | 4/1998 | Al-Salameh et al. | |
| 5,758,052 A | 5/1998 | Glowny et al. | |
| 5,774,668 A | 6/1998 | Choquier et al. | |
| 5,787,247 A * | 7/1998 | Norin et al. | .................. 709/220 |
| 5,796,999 A | 8/1998 | Azagury et al. | |
| 5,832,379 A * | 11/1998 | Mallinckrodt | ................ 455/427 |
| 5,835,857 A * | 11/1998 | Otten | .......................... 455/410 |
| 5,889,954 A | 3/1999 | Gessel et al. | |
| 5,893,118 A | 4/1999 | Sonderegger | |

(Continued)

*Primary Examiner*—Khanh Dinh
(74) *Attorney, Agent, or Firm*—Joseph J. Laks; Paul Kiel; Joseph J. Opalach

(57) ABSTRACT

A universal gateway that allows data to be transferred between one or more network protocols and one or more control protocols is described. The various protocols can coexist on the same physical network medium or on separate networks. The gateway also provides tunneling of network protocols through a selected protocol, and centralized control of network nodes. By using the gateway, end-users can mesh together traditionally standalone, incompatible, networks into a universally accessible, centrally administered, "supernetwork." The gateway provides a centralized node database, support for legacy protocols, a rules engine, and an object-oriented class library interface. Configuration is simplified through automatic device discovery. The centralized node database is managed by an active server node. High reliability access to the centralized node database is enhanced by the system fault tolerance provided by standby server nodes. When used in connection with a power line network, the gateway provides the ability to distribute various types of data streams over the power line. Routing handlers provided by the gateway allow virtually any of the legacy data networking services such as TCP/IP to be routed over the power-line.

15 Claims, 20 Drawing Sheets

U.S. PATENT DOCUMENTS

| | | |
|---|---|---|
| 5,966,706 A | 10/1999 | Biliris et al. |
| 6,091,320 A | 7/2000 | Odinak |
| 6,192,365 B1 | 2/2001 | Drapper |
| 6,272,127 B1 * | 8/2001 | Golden et al. ............... 370/352 |
| 6,314,526 B1 | 11/2001 | Arendt et al. |
| 6,859,882 B2 | 2/2005 | Fung |
| 7,032,119 B2 * | 4/2006 | Fung .......................... 713/320 |

* cited by examiner

| FIG. 3A | FIG. 3B |
|---|---|
| FIG. 3C | FIG. 3D |

FIG. 3

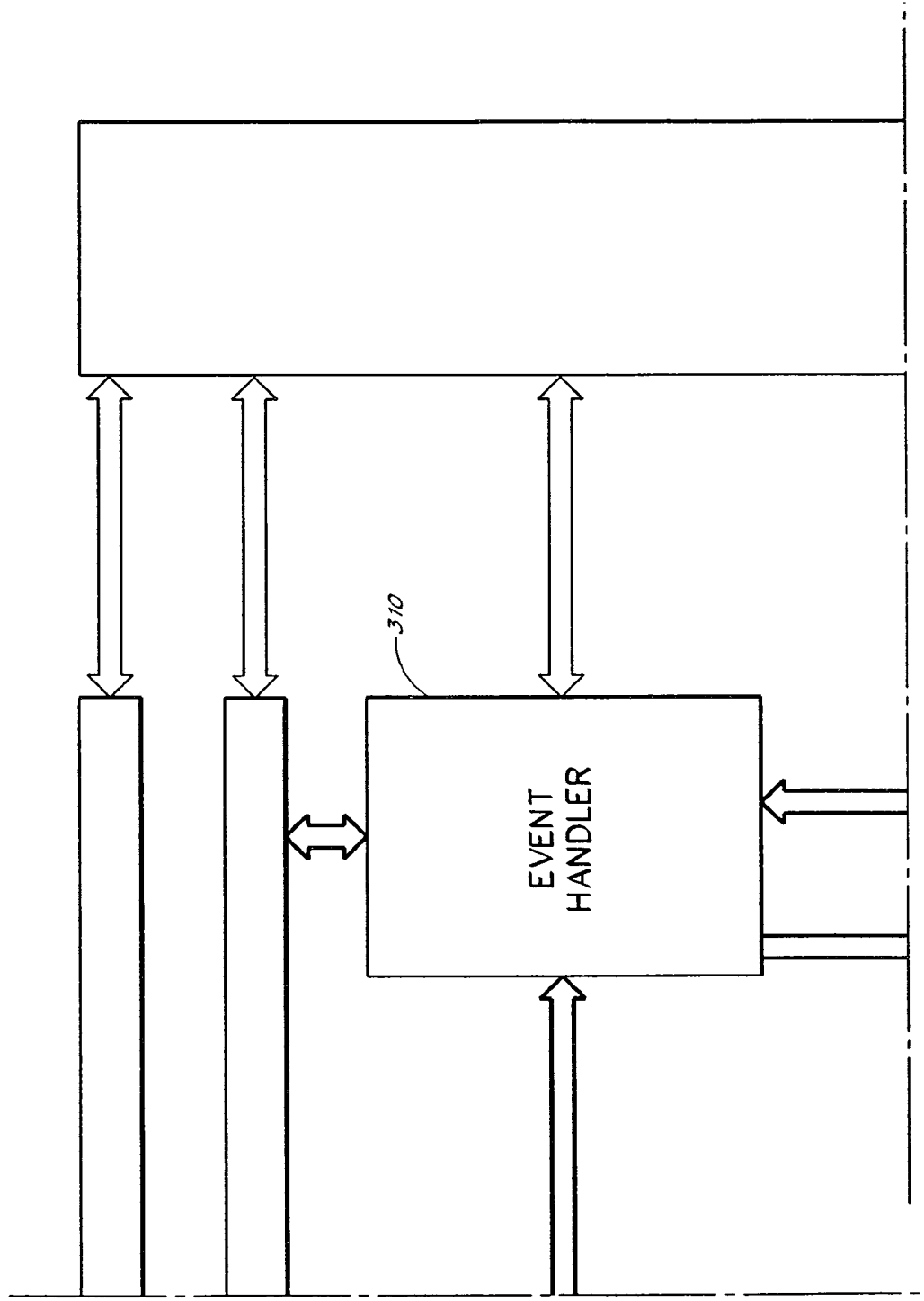

METHOD AND APPARATUS FOR UNIVERSAL DATA EXCHANGE GATEWAY

REFERENCE TO RELATED APPLICATION

This application is a continuation of U.S. application Ser. No. 09/235,084, filed Jan. 21, 1999, titled "METHOD AND APPARATUS FOR UNIVERSAL DATA EXCHANGE GATEWAY which claims priority from U.S. Provisional Patent Application No. 60/072,128, filed Jan. 22, 1998, titled "METHOD AND APPARATUS FOR UNIVERSAL DATA EXCHANGE GATEWAY."

BACKGROUND OF THE INVENTION

1. Field of the Invention

The disclosed invention relates to computer network protocol gateways, and more specifically, to gateways adapted to power line networking systems.

2. Description of the Related Art

The widespread availability of computers, especially personal computers, has generated a rapid increase in the number of computer networks. Networking two or more computers together allows the computers to share information, file resources, printers, etc. Connecting two or more personal computers and printers together to form a network is, in principle, a simple task. The computers and printers are simply connected together using a cable, and the necessary software is installed onto the computers. In network terminology, the cable is the network medium and the computers and printers are the network nodes. The network nodes "talk" to one another using one or more protocols such as Transmission Control Protocol, Internet Protocol (TCP/IP).

Gateways are used to perform protocol translations from one protocol to another protocol, so that two networks that use different protocols can be interconnected. For example, the Prodigy network service has a gateway that translates between its internal proprietary e-mail format and the Internet e-mail format.

Standard network protocols are typically designed under the assumption that each network node is a "smart" device having substantial processing and storage capabilities. For example, a typical Personal Computer (PC) has more than enough processing and storage capability to handle almost any network protocol. However, a typical printer is a "dumb" device that does not have the necessary processing and storage capabilities. Some manufacturers provide network printer adapters that allow a printer to be connected to a network. The printer adapters are single board computers that provide processing and storage capabilities similar to that of a fully configured PC. The network printer adapter thus converts the "dumb" printer into a "smart" device. Although the network printer adapters do work, they are relatively expensive and therefore unsuitable for many home and small office environments. Moreover, the printer adapters are not well suited for connecting other non-PC devices to a network. For example, users often desire to connect dumb devices such as outdoor lights, alarm systems, telephone systems and the like, to their computer networks. Buying a network adapter card to turn each of these dumb devices into a smart device would be prohibitively expensive.

The protocols used for smart devices are usually called "network protocols". The protocols used for dumb devices are often called "control protocols." The network protocols are quite different from the control protocols, both in capabilities and in complexity. Because of these differences, gateways designed to transfer data between network protocols are typically ill-suited to the task of transferring data between control protocols. Even more difficult is the task of transferring data between a network protocol and a control protocol.

Existing home control/automation products have tended to use control protocols that are based on a peer-to-peer model rather than a centralized client/server model. This severely limits the usability of these products, as each node is required to store state information and rules locally. Configuration of the network is often difficult due to a lack of easy-to-use, centralized user interface components. Furthermore, interoperability between competing products (X-10 and CEBus for example) has been virtually impossible.

SUMMARY OF THE INVENTION

The present invention solves these and other problems by providing a low-cost, easy to use, flexible, reliable, and scalable gateway architecture that allows data to be transferred between one or more network protocols and one or more control protocols. The various protocols can coexist on the same physical network medium. The gateway also provides tunneling of network protocols through a selected protocol, and centralized control.

Thus, the gateway provides tremendous benefits to end-users of data and control networks, particularly in the home and small business environments. Through the gateway, end-users can easily and conveniently mesh together traditionally standalone, incompatible networks into a universally accessible, centrally administered "super-network" that connects computers, printers, alarm systems, household appliances, lighting systems, telephones, etc.

The gateway provides a centralized node database, support for legacy protocols such as TCP/IP, a rules engine, and an object-oriented class library interface. The gateway provides broad home/small-office automation and control capabilities using common, easy-to-use graphical user interfaces such as internet browsers. Configuration is simplified through automatic device discovery. Access to the centralized node database is enhanced by the system fault tolerance provided by standby servers.

When used in connection with a power line network, the gateway provides the ability to distribute various types of data streams over the power line. For example, network users who have a cable-modem or other type of high-speed internet connection can distribute internet traffic anywhere in the home/office without the need for additional wiring other than the electrical wiring already in place. Voice data is also easily distributed throughout the home/office over the power line. Routing handlers provided by the gateway allow virtually any of the legacy data networking services and protocols commonly used today to be routed over the power-line.

BRIEF DESCRIPTION OF THE DRAWINGS

The advantages and features of the disclosed invention will readily be appreciated by persons skilled in the art from the following detailed description when read in conjunction with the drawings listed below.

Figure 1:
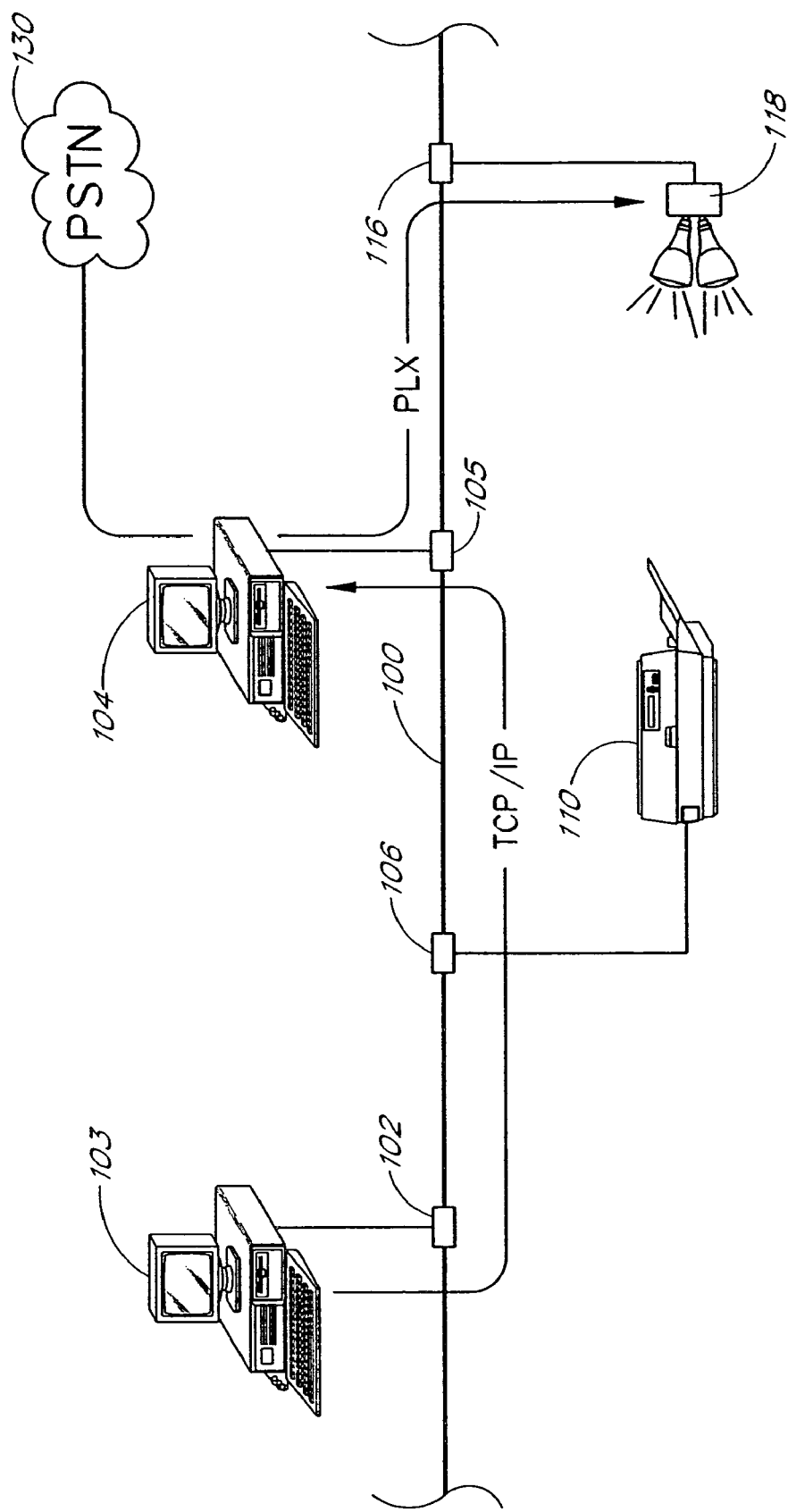
FIG. 1 is a block diagram of a network having smart nodes, such as personal computers, and dumb nodes, such as outside security lights.

In the drawings, the first digit of any three-digit number generally indicates the number of the figure in which the element first appears. Where four-digit reference numbers are used, the first two digits indicate the figure number.

DETAILED DESCRIPTION OF THE PREFERRED EMBODIMENT

FIG. 1 shows a computer network system suitable for use with a universal gateway. The system of FIG. 1 shows two different physical networks. The first physical network uses a network medium 100 (shown as a cable). A smart node (shown as a personal computer 103) is connected to the network medium 100 by a connector 102. A printer 110, a computer 104 and a security lighting system 118 are also connected to the network medium 100. The lighting system 118 is an example of a "dumb" node that has relatively little computing power or storage. The computer 104 is also connected to a second network 130, shown as a Public Switched Telephone Network (PSTN).

In a typical network environment, the network medium 100 is configured to carry data traffic for a variety of data protocols. Thus, as shown by example in FIG. 1, the computer 103 can communicate with the computer 104 using the TCP/IP protocol, while the computer 104 communicates with the lighting system 118 using a control protocol, such as, for example the Power Line Exchange (PLX) protocol described in the portion of this disclosure application labeled Appendix A. Appendix A includes portions of U.S. patent application Ser. No. 09/211950 titled "METHOD AND APPARATUS FOR POWER LINE EXCHANGE PROTOCOL," the disclosure of which is hereby incorporated by reference.

A universal gateway runs as a software program on a computer, such as the computer 104. The universal gateway provides a connection between different network protocols and between different physical networks. For example, as shown in FIG. 1, the universal gateway, running as a software program in the computer 104, connects the TCP/IP protocol to the PLX protocol, thereby allowing the computer 103 to communicate with the lighting system 118.

The universal gateway software running on the computer 104 also provides data transfer between separate physical networks, thereby allowing devices on separate physical networks to communicate with each other. In FIG. 1, the universal gateway provides data transfer between the network 130 and the lighting system 118.

The universal gateway is compatible with layered network protocols. Most networks configured for smart nodes (such as the computers 103 and 104) are based on a network architecture model developed by the Open System Interface (OSI) committee. The OSI architecture defines a network model that outlines each individual hardware and software layer within a communication system, the inter-dependencies between layers, and the unique function each layer performs.

Figure 2:
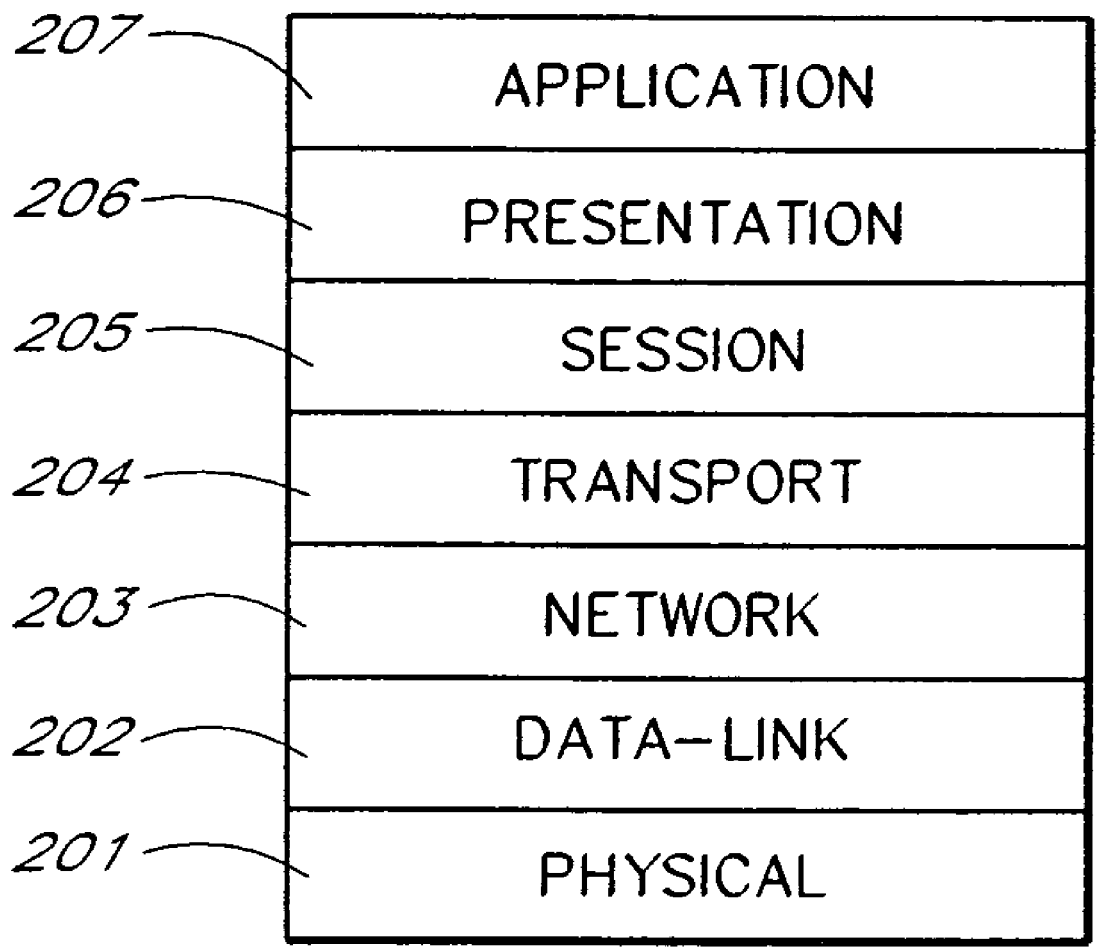
FIG. 2 is a block diagram of the seven-layer OSI network model.

FIG. 2 shows the OSI architecture organized as seven layers, from lowest to highest: a physical layer 201; a data link layer 202; a network layer 203; a transport layer 204; a session layer 205; a presentation layer 206, and an application layer 207. Each layer uses the layer immediately below it and provides a service to the layer immediately above. In some implementations a layer may itself be composed of sub-layers. A layer is the software and/or hardware environment of two or more communications devices or computers in which a particular network protocol operates. A network connection may be thought of as a set of more or less independent protocols, each in a different layer or level. The lowest layer governs direct node-to-node communication between the hardware at different nodes; the highest consists of user application programs. Each layer uses the layer beneath it and provides a service for the layer above. Each networking component hardware or software on one host uses protocols appropriate to its layer to communicate with the corresponding component (its "peer") on another node. Such layered protocols are sometimes known as peer-to-peer protocols.

The advantage of layered protocols lies in the fact that the methods for passing information from one layer to another are specified clearly as part of the protocol, and changes within one protocol layer are prevented from affecting the other protocol layers. This simplifies the task of designing and maintaining communication systems.

The physical layer 201 is the lowest layer in the OSI layered model. It includes electrical and mechanical connections of the network, including portions of Media Access Control (MAC). Media Access Control refers to control, and access to, the data transmission medium 100 (e.g., the network cable). The physical layer 201 is used by the data link layer 202.

The data link layer 202 is the second lowest layer in the OSI model. The data link layer 202 splits data into frames (to be sent on the physical layer 201) and receives acknowledgement frames. The data link layer 202 performs error checking and re-transmits frames not received correctly. The data link layer 202 provides an error-free virtual channel to the network layer 203. The data link layer 202 is typically split into an upper sublayer, Logical Link Control (LLC), and a lower sublayer that includes portions of the Media Access Control (MAC).

The network layer 203 is the third lowest layer in the OSI seven layer model. The network layer 203 determines routing of packets of data from sender to receiver via the data link layer 202 and is used by the transport layer 204. The most common network layer protocol is IP.

The transport layer 204 (or "host-host layer") is the middle layer in the OSI model. The transport layer 204 determines how to use the network layer 203 to provide a virtual error-free, point-to-point connection so that a first node can send messages to a second node and the messages will arrive uncorrupted and in the correct order. The transport layer 204 establishes and dissolves connections between nodes.

The session layer 205 is the third highest protocol layer in the OSI model. The session layer 205 uses the transport layer 204 to establish a connection between processes on different nodes. The session layer 205 handles security and creation of the session.

The presentation layer 206 is the second highest layer in the OSI model. The presentation layer 206 performs functions such as text compression, code or format conversion to try to smooth out differences between nodes. The presentation layer 206 allows incompatible processes in the application layer to communicate via the session layer.

The application layer 207 is the top layer of the OSI model. The application layer 207 is concerned with the user's view of the network (e.g. formatting electronic mail messages). The presentation layer 206 provides the application layer 207 with a familiar local representation of data independent of the format used on the network. Examples of application layer protocols include: Telnet, File Transfer Protocol (FTP), Simple Network Management Protocol (SNMP), Simple Mail Transfer Protocol (SMTP), Internet Control Message Protocol (ICMP), NetWare Core Protocol (NCP), Routing Information Protocol (RIP), Service Advertising Protocol (SAP), Trivial File Transfer Protocol (TFTP), and System Fault Tolerance Protocol (SFTP).

Figure 3A:
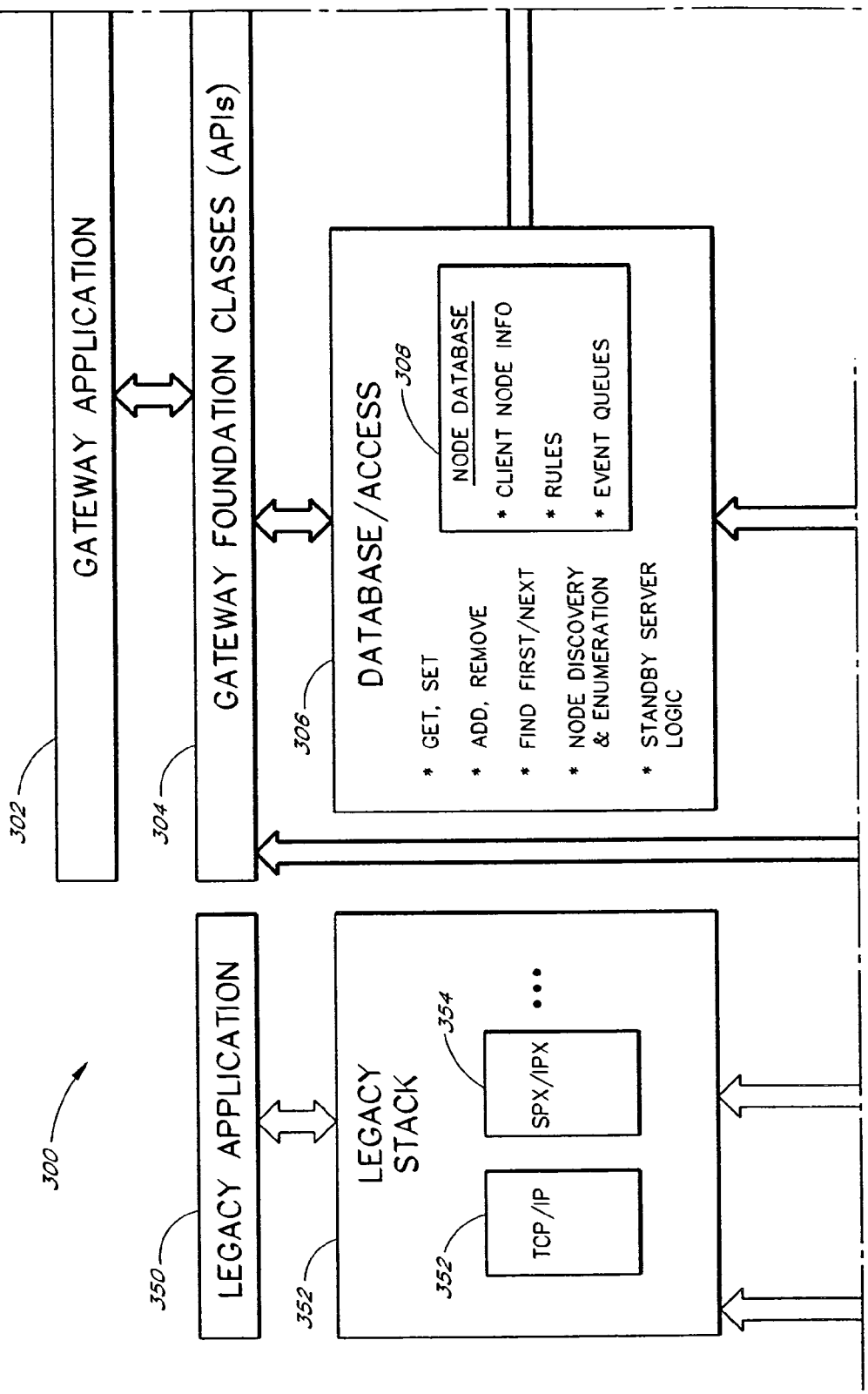
FIG. 3 (consisting of FIGS. 3A, 3B, 3C and 3D) is a block diagram of the universal gateway architecture.
Figure 3C:
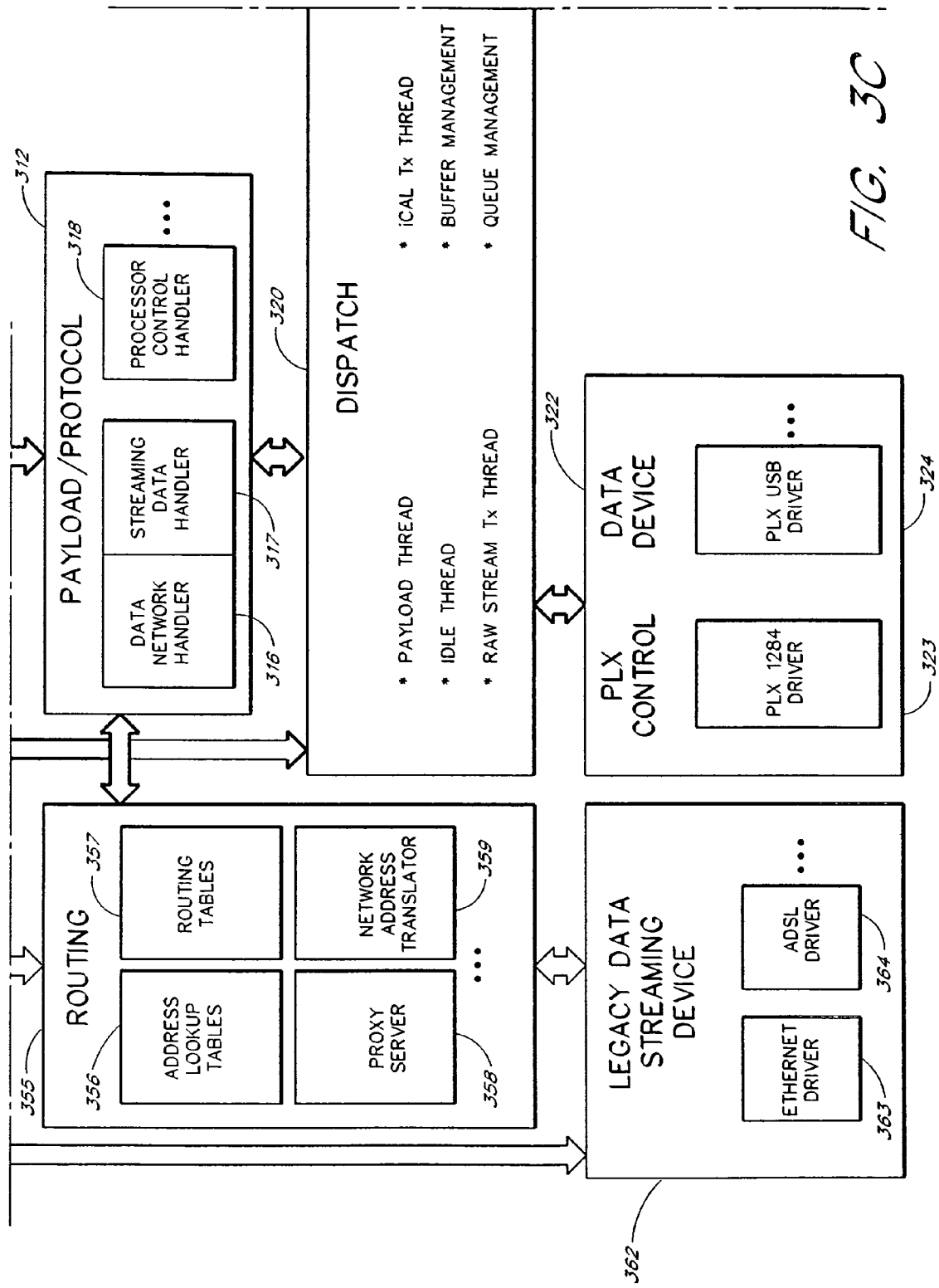
Figure 3D:
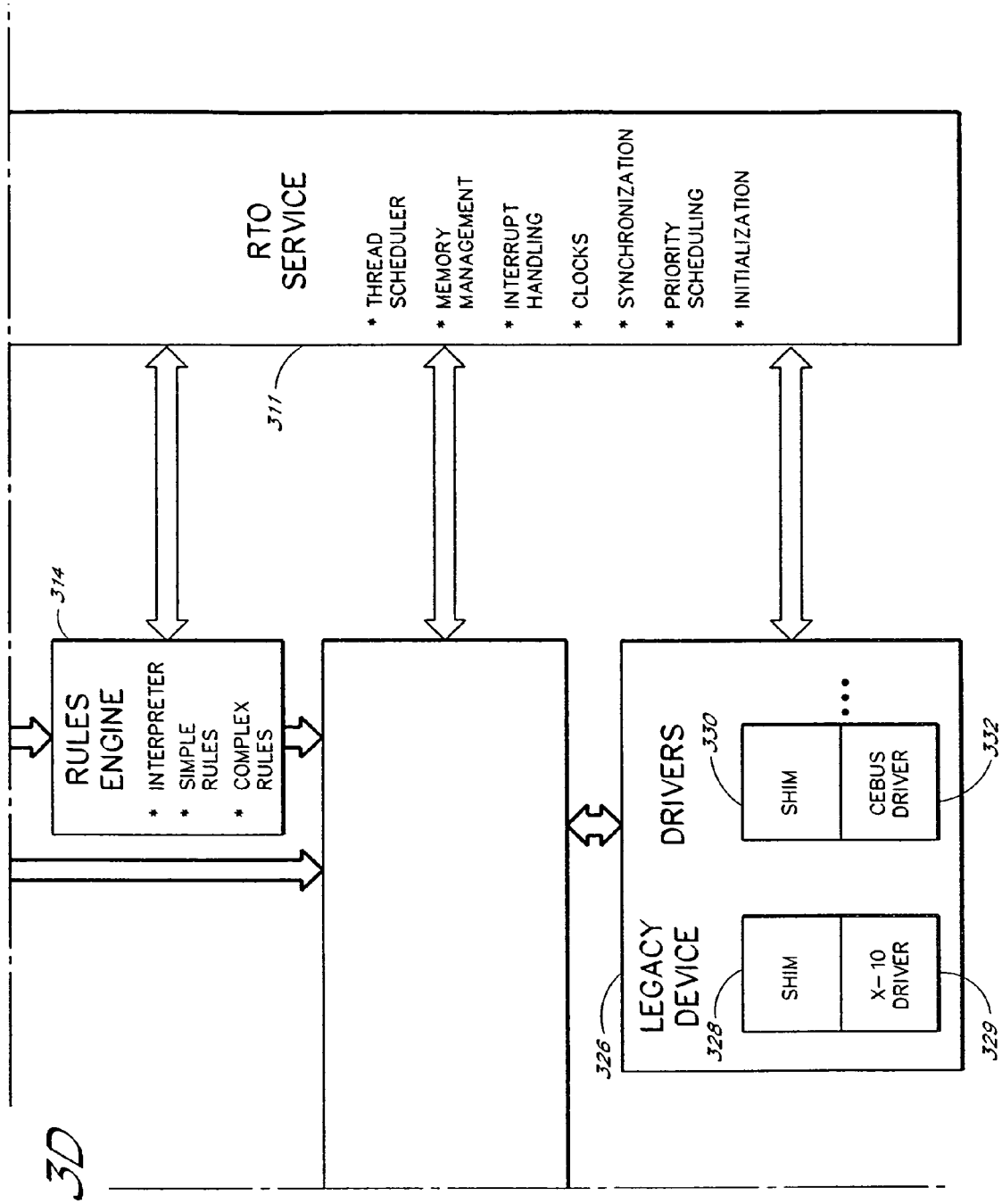

FIG. 3 shows the architecture of the universal gateway 300 and how the gateway 300 interacts with other software components such as application programs, hardware drivers, etc. An application program 302 communicates with the gateway 300 using a set of gateway foundation classes 304. The gateway foundation classes 304 communicate with a database access module 306, an event handler 310, a dispatcher 320, and a runtime operating system service (RTOS) 311. The database access module 306 includes an information repository called (a node database) 308. The node database 308 can be organized as a database, a linked lists, a table, a map, a container, etc. The database access module 306 also communicates with the event handler 310, and a payload/protocol processor 312. The payload/protocol processor includes one or more payload/protocol handlers, such as a raw data handler 316, a streaming data handler 317, and a CAL control handler 318. The event handler 310 also communicates with a rules engine 314 and the dispatcher 320. The dispatcher 320 also communicates with the RTOS 311, the rules engine 314, PLX device drivers 322, and legacy device drivers 326. The PLX device drivers include PLX control device drivers 323 (for dumb devices) and PLX data device drivers 324 (for smart devices).

The gateway 300 provides protocol translations from one protocol to another protocol, so that two networks that use different protocols can be interconnected. The networks may be real, physical, networks and the networks may be virtual networks (i.e., exist only in software). The gateway 300 provides an interface between a legacy protocol and a primary (i.e. desired) protocol (e.g. a power line protocol). The term legacy protocol is not restricted to pre-existing protocols. Rather, the term legacy protocol is intended to refer to any protocol other than the primary protocol. The legacy device drivers include, for example, an X-10 driver 329 and a CEBus driver 332. Each legacy device driver also, optionally, includes a shim that adapts the legacy device driver to the gateway. In one embodiment, the primary protocol as a power line protocol, but the gateway 300 is not so limited. Thus, the primary protocol can be any protocol, including, for example, TCP/IP, IPX, ADSL, and any of the other protocols listed elsewhere in this disclosure or known in the art.

For streaming legacy device drivers 362, such as an ethernet driver 362 and an ADSL driver 364, the gateway provides a legacy stack 352. The legacy stack 352 supports OSI protocol stacks such as a TCP/IP stack 353 and an SPX/IPX stack 354. The legacy stack 352 communicates with the streaming legacy device drivers 362 and routing handlers 355. The routing handlers 355 communicate with the streaming legacy device drivers 362, the legacy stack 352, and the payload/protocol processor 312. The legacy stack 352 also communicates with legacy applications 350.

The gateway 300 serves as a connecting point between various types of networks and provides support for both control and data networks, including, but not limited to, Ethernet, Digital Subscriber Line (DSL and ADSL), Power Line Exchange (PLX), X-10, and CEBus.

The gateway 300 has two primary functions, node management and data routing. As a node manager, the gateway 300 is responsible for discovering, enumerating, retrieving, storing and processing network node state information. The state information is stored in the node database 308. The node database 308 is based on a Generic Common Application Language (CAL) specification. CEBus, defined in EIA-600, is an industry standard control language for controlling bus devices. EIA-600 provides a skeleton for a Common Application Language for use within home LANs. The Generic CAL is defined in the EIA-721 series of standards (including EIA-721.1, EIA-721.2, EIA-721.3, and EIA-721.4). The CEBus Industry Council (CIC) has defined a Home Plug & Play (HPP) specification that fleshes out that skeleton by defining the "grammatical" rules for using the generic CAL.

The HPP specification details a set of behavioral characteristics for products and systems within the home that will allow them to take actions based upon the state of the home. For example the specification identifies different conditions within the home such as "occupants away" or "occupants home and asleep" to allow home systems to take appropriate action like arming the security system, shutting off interior lights, or setting the temperature. The HPP specification also includes information for developing Windows '95 PC-based applications for home control.

The Common Application Language defined within EIA-600 provides a framework for communication among home LAN products produced within divergent industry sectors (e.g., entertainment, computers, heating/cooling, kitchen appliances, etc.). Each industry sector defines the "application contexts" (i.e., grammatical rules) under which its products will use the language. The CIC was created to serve as the support organization that helps divergent industry sectors develop "harmonious" application contexts. CIC's HPP is a compendium of harmonious application contexts for those industry sectors pursuing the home LAN market with CAL based interoperable products.

The CEBus/Generic CAL specification is hereby incorporated by reference in its entirety.

The gateway 300 also provides the rules engine 314 that monitors node state changes and acts on the state changes in accordance to rules defined using a universal Rules Definition Language (RDL) syntax.

The gateway 300 also handles data-streaming and routing tasks by using Dispatch Control Blocks (DCBs). The routing handlers 355 provide for such functionality as TCP/IP tunneling over PLX, proxy server, and network address translation. Shims (328, 330) are provided to allow non-PLX power line based nodes to seamlessly plug into a PLX network. The gateway foundation classes 304 provide an object-oriented API library for use by user interface and system management applications 302. The gateway 300 further provides support, which allows for applications that use legacy, non-Universal network APIs (MFC, TLI, Sockets, Home API, etc.) to communicate with network nodes. This allows transparent data streaming of legacy network data (Ethernet, ADSL, etc.) over the network, including the ability to control nodes managed by the gateway 300 using Java and a Web Browser.

The node database 308 is the repository for node data stored by the gateway 300. The node data includes node configuration profiles obtained from each client node, event queues, client node bindings and rules. Other components of the gateway 300 access the node database 308 through a set of access methods 306.

The event handler 310 and the rules engine 314 are responsible for activities that occur as a result of state changes occurring in client nodes. The rules engine 314 interprets rules associated with a state change, and is responsible for scheduling notifications or CAL send requests that might be triggered as a result of the rules evaluation. The rules engine 314 works with the node database 308 and the event handler 310. The event handler 310 processes event queues and performs event notification. These event notifications include internal notifications to other components of the gateway 300 and external notifications to applications 302 that have registered to receive event notifications. Interaction between the gateway 300 and the applications 302 are done through the gateway foundation classes 304.

The dispatcher 320 is responsible for directing run-time operations of the gateway 300, including send/receive queue handling, thread initialization, and management, etc. Gateway activities requiring management include application CAL send requests, raw streaming data requests, receive events, and background housekeeping tasks. The dispatcher 320 provides a generic interface to the network device drivers 322, 326 allowing support for various types of network nodes without requiring detailed knowledge of the underlying network controller hardware served by the drivers 322, 326.

The device drivers 322, 326 communicate directly with the network communication hardware (USB or parallel port PLX node, X-10 shim, CEBus Shim, etc.) and handle data-link layer 202 functions (e.g., generating/interpreting MAC header, low level timing, etc). Portions of the drivers 322, 326 that talk directly to the underlying hardware are typically platform specific in order to support the variety of connections (e.g., Universal Serial Bus (USB), parallel ports, FireWire Ports, PCI slots, ISA slots, serial ports, etc.) that can exist between the driver and the hardware. The gateway 300 provides the shim components 328, 330 to handle conversion of control data received from legacy X-10 and CEBus nodes to a format used by the gateway 300.

The payload/protocol handlers 316-318 in the payload/protocol processor 312 are responsible for parsing and processing received packet data. The data handlers 316-317 work with the routing handlers 355. The routing handlers 355 parse the raw data packet headers. The router handlers 355 also consult address and routing tables that assist in directing the flow of data between the various legacy protocol stacks 352 and legacy streaming drivers 362.

To maintain code portability across various platforms and operating systems, platform specific code is isolated in a platform abstraction layer provided by the RTOS 311. Typical runtime services include thread scheduling, memory management, interrupt handling, clocks, synchronization, priority scheduling, initialization, etc.

Many of the components in the gateway 300 interact, either directly or indirectly, with the node database 308. The task of initially building and maintaining the database is handled primarily by the dispatcher 320, the drivers 322, 326, and the payload/packet handlers 312. User interface and management applications access and/or modify the node database 308 through the gateway foundation classes 304.

The node database 308 is structured such that real-time access is fast and efficient. A compromise between speed/memory-usage is used, with priority typically given to efficient memory usage over access speed. In some embodiments, portions of the node database 308 are saved in non-volatile storage.

The node database 308 includes client node configuration and node state information. This includes context, object, and Instance Variable (IV) information associated with each client node. This information is obtained during node discovery using network command and network requests. Of this information, dynamic IVs are saved in permanent storage. For most objects (not including Node Control or Context Control) this includes current value IVs that define the state of the node.

The node database 308 also contains some gateway-specific information. Besides the node context that exists for each node, the node database 308 contains a database server context containing objects needed for node management. The database server context includes a network node list object that contains an array of client node addresses that are known by the gateway 300.

The node database 308 is accessed through a generic set of access methods 306. Since most access comes directly or indirectly through an network message, the database access methods 306 are responsible for getting and setting variable values using typical network Get and Set methods. These methods include GetValue, GetArray, SetValue, SetArray, SetON and SetOFF. Which method is appropriate depends upon the data type of the instance variable being acted on. For example, the CAL network defines four IV data types: Boolean (GetValue, SetValue, SetON, SetOFF), Numeric (GetValue, SetValue), Character String (GetValue, SetValue), and Data (GetArray, SetArray)

For the most part, these methods take a similar set of input keys, which identify the data being acted upon and any number of input arguments. Each method then returns requested information (if any) and a status. For example, the generic prototype for methods that act on CAL IVs resemble the following:

ENUM_STATUS <method>(NodeID,ContextID,ObjectID,IVID,args, . . . , *returnVal)

In this case NodeID, ContextID, ObjectID, and IVID are the keys. For non-CAL objects a different set of keys are be used.

When a set operation occurs on an instance variable, event notification is made to the rules engine 314 through the event handler 310 indicating that a state change event has taken place. The rules engine 314 then interprets the rules/report-conditions pertaining to the instance variable that changed and, if action is warranted, schedules events through the event handler 310. This can result in the generation of a network send request through the dispatcher 320, or a notification to a higher level application 302 through the foundation classes 304.

As described above, when an access call is made to GET or SET a node IV, four pieces of information (or keys) are typically provided. These include a NodeID, a ContextID, an ObjectID, and an IVID.

The NodeID is a node address assigned during configuration (this can occur at the time of manufacture or dynamically during run-time). For a PLX network, this is a 4 byte field and can take on values between 0x00000001 and 0xffffffef; with addresses above this range being reserved for broadcasts and other PLX specific uses. For non-PLX networks, some address mapping/translation is typically required. The routing handlers 355 take care of address translation issues.

The ContextID is two bytes long with the high byte being an optional context number with values in the range 0xA0-0xDE, or 0 if not used. The low byte is a Context Class value in the range 0x00-0x9E (these are defined in the generic CAL specification).

The ObjectID is a one byte Object Number value in the range 0x01-0x3E.

The IVID is an ascii character (or characters) that identifies an Instance Variable within a given context and object type A node is described by of a group of contexts; each context consists of a group of objects; each object consists of a group of IVs. The database is structured such that access to an IV, given the 4 pieces of information just discussed, involves the following look-up algorithm.

1) The NodeID maps into a node list entry (typically using a hashing algorithm), where each node points to an array of context records. The ContextID is not defined such that it can be used as a direct index to get to the desired context record, so, a linear look-up occurs here. A node typically has only a few (2 or 3) contexts. Each context record contains a pointer to an array (or a linked list) of object records.

2) The ObjectID is of a format such that it can be used as a direct index to get to the desired object record. Each object record contains a pointer to an array of IV records.

3) A linear search is used to locate the desired IV to act upon based on the IVID. This is efficient since for most client nodes only a few IVs are stored in the node database 308. Most GET/SET requests relate to a current value of the IV. If the current value is always stored first in the IV list, then an extended linear search will rarely be needed.

The discovery process used by the gateway 300 to populate the network node list varies depending on the type of node. For a typical PLX node using CAL, the following algorithm is used:

1) A CAL "Ping" Request is broadcast on the network (this is typically done during initialization but can also be done periodically as well). The format of this request is similar to that of any other CAL Command/Request and uses the following parameters:

Context Class=0 (Universal Context),
Object Number=1 (Node Control Object),
Method=50h=PING_REQUEST (not defined in the generic CAL spec.),
IV=<any IV OK>.

This request is differs from a standard CAL request in that it can be sent either directly to a node or broadcast to all nodes. Ping requests do not require the typical CAL format response packet from the receiver.

2) Nodes receiving the CAL Ping Request send a CAL Ping Response back to the sending node. Although this packet is referred to as a "response," the syntax of the packet differs from a traditional CAL Response packet. The response differs in order to allow the ping request to be sent as a broadcast. The format of the response packet (which actually resembles a CAL Command/Request rather than a CAL Response) is similar to a ping request except the method code is 51h instead of 50h.

3) When the gateway 300 receives a ping response from a node that is not listed in the network node list, the gateway 300 adds the node to the list and adds the node's IV information to the node database 308.

4) Optionally, the gateway 300 sends a CAL Request to any node in the node list that it has not heard from for a certain length of time. If the node is unresponsive, it is removed from the list.

5) Ping Response packets are also sent when a client node is powered on or is reset.

For legacy control nodes (such as X-10 or CEBus nodes) the node discovery process varies, according to the legacy specifications. The gateway 300 handles these nodes with the assistance of the shims 328, 330. The shims 328, 300 are aware of both the CAL node discovery method discussed above and the legacy methods used by non-PLX drivers. In response to a ping request, the shim converts the ping request into the equivalent request (or set of requests) required to perform node discovery on the legacy control network. As nodes are discovered, the shim 328, 330 generates ping response packets and passes them up to the upper layers of the gateway 300. As far as the rest of the gateway 300 is concerned, these legacy control nodes are PLX nodes. The shims 328, 330 are further discussed below.

The gateway 300 allows user interface and management applications 302 to access the node database 308 through the foundation classes 304. In this regard the gateway 300 acts as an application server. To enhance the accessibility of the node database 308 by the applications 302, the gateway 300 supports the existence of multiple application servers, where one server acts as an active application server and the others servers act as standby application servers.

Figure 4:
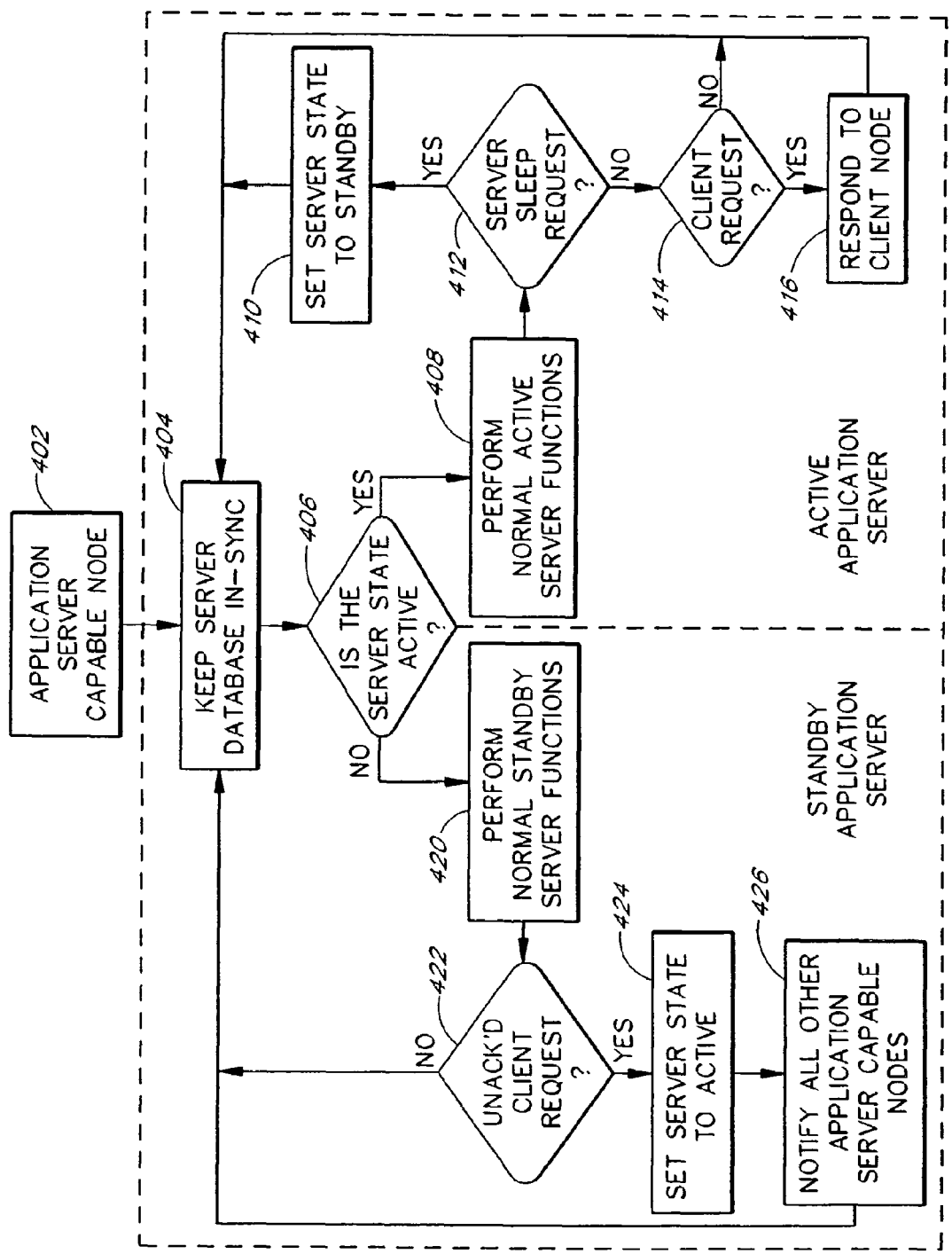
FIG. 4 is a flowchart showing the server activation algorithm.

Each server stores the same node database 308 and keeps information its node database 308 information up to day with (synchronized with) the other nodes by listening to network traffic, monitoring network node state changes, and updating its node database 308 accordingly. However, the active application server is the only node that actually evaluates rules associated with state changes and performs the required event notifications. Should the active server become inoperable for some reason, a standby server will detect this and become "activated." The activation process for an application server node 402 is shown in FIG. 4, beginning with a synchronization block 404, wherein the node 402 updates its node database 308. After updating the node database 308, the process advances to a decision block 406. If, in the decision block 406, the node is in the active server state, the process advances to an active server block 408; otherwise, the process advances to a standby server block 420. Upon completion of the active server block 408, the process advances to a decision block 412. If, in the decision block 412, a server sleep request is detected, the process advances to a set standby block 410; otherwise, the process advances to a decision block 414. If in the decision block 414, a client request is detected, the process advances to a response block 416; otherwise, the process returns to the synchronization block 404. Upon completion of the set standby block 410 or the response block 416, the process returns to the synchronization block 404.

Upon completion of the standby server block 420, the process advances to a decision block 422. If, in the decision block 422, a unacknowledged client request is detected, the process advances to a set-active block 424; otherwise, the process returns to the synchronization block 404. Upon completion of the set active block 424 the process advances to a notify block 426 wherein other application server capable nodes are notified that the present server node is going active. Upon completion of the block 426, the process returns to the synchronization block 404.

The rules engine 314 and the event handler 310 become involved when a state change occurs in a client node. Since such a state change occurs when a SET method is executed, each SET method notifies the rules engine 314 of the change through the event handler 310. The rules engine 314 then checks for the existence of any rules associated with the IV that changed, and it determines if any event notifications are needed. The rules can be created by users as they bind various nodes to each other through a user interface using the foundation classes 304. Default rules can also exist for certain nodes and conventional operations that require no explicit user definition.

Rules can be either simple or complex. Simple rules are those characterized by a one-to-one or one-to-many binding relationship between client nodes. An example of a simple one-to-one rule would read something like "if Light Switch A is switched to ON, then turn on Light Bulb A." An example of a one-to-many rule would read "if Light Switch A is switched to ON, then turn on Light Bulbs A, B, C and D." Complex rules deal with many-to-one or many-to-many bindings (e.g., "If Light Switch A is switched ON AND user has security clearance THEN turn on Light Bulbs A, B, C, and D."

Figure 5:
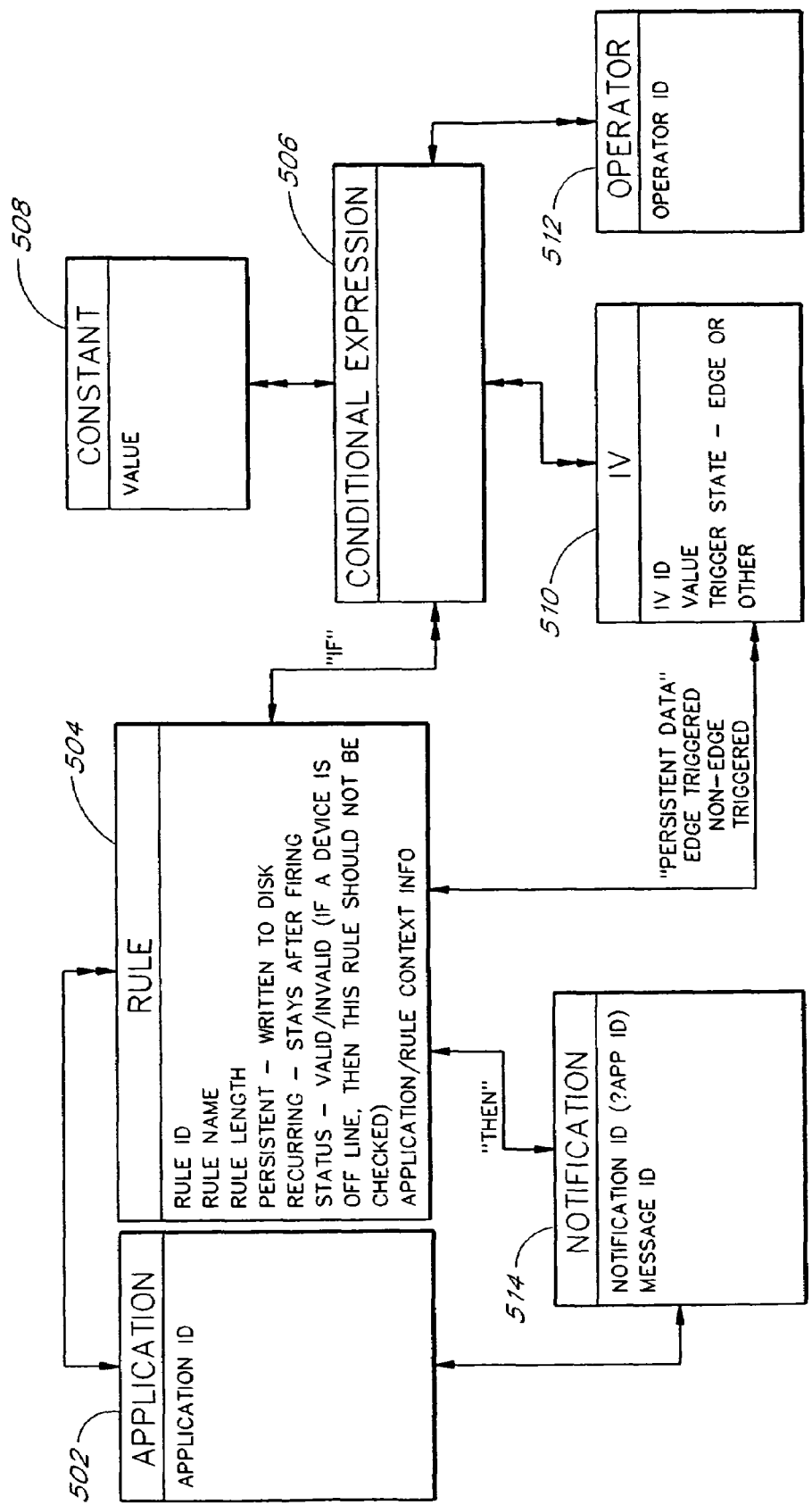
FIG. 5 is a data chart shown the components of a rule.

The gateway 300 provides a versatile syntax for rules definition known as the universal Rules Definition Language (RDL). FIG. 5 is a structure diagram showing the components of rules and the interaction between an application 502 and a rule 504. As shown in FIG. 5, an application 502 creates one or more rules, including a rule 504. The rule 504 can include an "if" statement involving a conditional expression 506. The conditional expression 506 can include one or more constants 506, one or more operators 512, and one or more Ivs. A "then" clause in the rule 504 specifies a notification 514 that is returned to the application 502. Each constant includes a value. Each operator includes an operator identification (ID). Each IV includes an ID, a value, and a trigger state. Trigger states include edge triggered and non-edge triggered. Each notification includes a notification ID and a message ID.

A rule includes an event and an action. The action is an array of strings that are application specific. The event is a boolean expression describing whether or not a given state exists on the network. Event strings are specified using the grammar below. The grammar has undefined terminal symbols integer_constant, character_constant, floating_constant, and string. Note that the identifier terminal has a specific format. The first integer_constant after the caret '^' or pound sign '#' is a node address specified in hexadecimal. The second (optional) integer_constant is a CAL context number in hexadecimal. The third integer_constant is a CAL context class in hexadecimal. The fourth integer_constant is a CAL object number in hexadecimal. The character_constant is a CAL instance variable (IV). The caret in front of the identifier specifies an "edge-triggered" or "just changed" iv. The pound sign signifies that the iv is "level" or "existing value". A rule can only have one "edge-triggered" identifier.

Rule Grammar

IF OR expression THEN ACTION expression
OR expression

---
AND_expression
OR_expression || AND_expression
---

AND expression

---
equality_expression
AND_expression && equality_expression
equality_expression
    relational_expression
    equality_expression == relational_expression
    equality_expression != relational_expression
relational_expression:
    additive_expression
    relational_expression < additive_expression
    relational_expression > additive_expression
    relational_expression <= additive_expression
    relational_expression >= additive_expression
additive_expression:
    multiplicative_expression
    additive_expression + multiplicative_expression
    additive_expression − multiplicative_expression
multiplicative_expression:
    primary_expression
    multiplicative_expression * primary_expression
    multiplicative_expression / primary_expression
    multiplicative_expression % primary_expression
primary_expression:
    identifier
    constant
    string
    ( OR_expression )
identifier:
    ^integer_constant.integer_constant$_{opt}$.$_{opt}$integer_constant.-
integer_constant.character_
constant
    #integer_constant.integer_constant$_{opt}$.$_{opt}$integer_constant.-
integer_constant.character_constant
    constant:
        integer_constant
        character_constant
        floating_constant
---

ACTION expression

---
Notify_applications_registered_for_this_rule
Send_PLX_packet_to_node
---

For non-PLX nodes that contain embedded rules using some legacy syntax (e.g. a syntax other than RDL), the rules engine 314 (with help from the shims 328, 330) converts the legacy syntax into RDL syntax.

The dispatcher 320 is responsible for directing the order and flow of operations that occur inside the gateway 300. During initialization, the dispatcher 320 calls the RTOS 311 to create various handler threads that manage run-time operations. The handler threads include, listed in order of priority: 1) a Receive Payload Thread, 2) a Raw Data (streaming) Transmit Thread, 3) a CAL Transmit Thread, and 4) a Low Priority Idle Thread (optional).

Most of the handler threads listed above send packets to client nodes. Before making a call to a device driver send routine, these threads first wait (sleep) on a TxFreeCount semaphore, which indicates that the driver is capable of handling a send request. Also, the CAL Transmit thread ensures that no CAL packets are sent to clients that are in "delayed" mode. Delayed mode is discussed below.

The dispatcher 320 also manages the queues that are acted on by the handler threads. The handler threads and other gateway 300 components call the dispatcher 320 to add and remove packets to/from the queue. The dispatcher 320 uses Dispatch Control Blocks (DCBs) to describe CAL request/response packets and raw data stream fragments.

The DCB structure is defined (in C/C++ syntax) as follows:

```
typedef struct sDCB
{
    void    *link;
    UINT8   *buffer;
    UINT32  destDevAddress;
    UINT32  srcDevAddress;
    UINT16  timeStamp;
    UINT16  reserved1;
    UINT8   destSocket;
    UINT8   srcSocket;
    UINT8   sequenceNo;
    UINT8   bufferSize;
    UINT8   controlInfo;
    UINT8   reserved2[5];
}
tDCB, *PDCB;
```

The link field may be used by the owner of the DCB for any purpose. It is typically used for DCB queue management. The buffer and bufferSize fields point to and define the size of packet/fragment data described by the DCB. The destDevAddress and srcDevAddress identify the destination and source nodes associated with the DCB. The destSocket and srcSocket can also be used to further identify destination/source applications within nodes. The timeStamp field is used by the gateway 300 to assist in handling various timeout conditions. The sequenceNo is used to order packets, primarily for raw data packet streams. The controlInfo field is used to store various bit-fields and flags that are used to indicate special features/handling required of the DCB and associated data packet. These bits control such features as data encryption, authentication, and data streaming. The reserved1 and reserved2 fields are used internally by the gateway 300 and are used by external applications.

The Receive Payload thread is typically the highest priority thread started by the dispatcher 320, and executes whenever a device driver 322, 325 has queued a receive packet. Interrupt/poll service routines in the device drivers 322, 325 can pre-empt this thread. This thread is responsible for removing packets from the receive queue and handing them to the payload/protocol handler 312 for further processing. This thread executes until nothing is left in the receive queue (or possibly until some threshold is reached) and then sleeps until more receives are queued.

The Raw Data Transmit thread executes when two conditions are true: 1) a raw data/streaming transmit request has been queued by an application; and 2) any higher priority threads/interrupt-handlers have finished executing. The Raw Transmit Thread gets the next entry in the send queue and hands it to the appropriate device driver send routine. This is repeated until there are no more reports left in the send queue or until some threshold has been reached. The Raw Data Transmit thread then sleeps until new transmits are scheduled.

The CAL transmit thread is similar to the Raw Data thread. The primary difference between the two is that the CAL transmit thread deals with a different send queue. The CAL transmit thread operates on CAL request events. The CAL request events are usually scheduled as a result of requests coming from the application 304. These application requests are placed on the CAL send queue by the dispatcher 320. The CAL transmits can be used to read (GET) and write (SET) state information stored in remote nodes or in the node database 308. The CAL transmits can also be generated by internal and external state changes that trigger events defined in the rules interpreted by the rules engine 314.

An Idle thread is runs at a low priority in the system and is optional. If used, the idle thread handles low priority tasks that can safely be put off indefinitely while higher priority threads run. Low priority tasks generally include the following activities: 1) memory management and garbage collection tasks; 2) sending out watchdog/ping packets to detect and age non-responsive nodes; and 3) synchronizing cached database information with the non-cached (persistent) backing store copy. If the idle thread is supported, the dispatcher 320 provides an interface to the other modules so that they can schedule low priority tasks to be called by the Idle Thread.

The device drivers 322, 326 accept generic requests from the dispatcher 320 (described by a Dispatcher Control Block or DCB) and convert those requests into an I/O request appropriate for the underlying network node.

The device drivers 322, 326 also process packets received from network hardware and build DCBs that are then passed up to the dispatcher 320 for further processing. The dispatcher threads are the only components of the gateway 300 that interface with device drivers 322, 326. The interface provided by the device drivers 322, 326 to the dispatcher 320 includes a DriverSend interface that is passed a DCB. The Media Abstraction Component (MAC) module builds a MAC header and initiates the actual packet-send to the network controller hardware. A driver interrupt/polling routine queues receive events on the payload receive queue which is then processed at a later time by the Receive Payload Thread.

Most of the discussion below assumes the device driver is driving a PLX-based node. However, the interface provided to the upper layers is generic such that other drivers are supported by the gateway. The shims 328, 330 are provided to allow non-PLX based nodes such as X-10 and native CEBus nodes to be seamlessly supported by the gateway 300.

When a driver, such as, for example, the PLX control driver 323, is loaded, a driver initialization module brings the network interface hardware serviced by the driver to a functional state. Upon completion of initialization, the driver 323 and the hardware are ready to send and receive packets. Part of driver initialization typically includes setting up a receive-handler ISR/poll-routine, determining/reserving hardware resources, and starting any housekeeping threads. Typically a timer thread is used to check for transmit timeout and dead device driver/hardware problems.

On sends, the dispatcher 320 supplies a packet/fragment data address, and control information to the driver 323 using a DCB. The driver 323 then creates the appropriate MAC header and initiates the transmit. The number of transmits that can be handled simultaneously is a hardware/firmware-dependant value (herein referred to as a TxFreeCount) that can be read during initialization.

After copying the transmit data to the network controller, the DriverSend routine begins a send timeout timer. At this point, unless a response indicating transmit complete is received synchronously (following the send before the DriverSend routine returns), the transmit is in a "pending" state until the network hardware indicates a transmit complete status. While transmits are in the pending state, more sends may occur as long as the network controller has buffer space available, as defined by the TxFreeCount. Once the number of pending sends equals the TxFreeCount, the DriverSend routine is locked (meaning no more sends may occur) and remains locked until the ISR/poll-routine unlocks it following receipt of transmit success status or transmit timeout status.

A Driver Interrupt/Poll Service Routine (or ISR handler) routine runs at the highest priority in the system (preferably interrupt context) and is responsible for interpreting/stripping-off the received packet's MAC header, and queuing the packet with the dispatcher 320 for later processing by the appropriate Payload Handler. Receive packets fall into one of the following categories: 1) an internal (or local) control/status packet; 2) a CAL command/request; 3) a CAL immediate response; 4) a CAL delayed response, or 5) raw stream data.

Internal Control/Status packets are used primarily to indicate transmit-complete or error conditions. Handling of transmit status packets in the ISR handler typically varies somewhat depending on the type of transmit packet (e.g., CAL/Raw, Local/Remote) for which the status applies.

For both Raw fragments and CAL packets, if the status indicates the transmit was successfully completed, the ISR routines adjust the TxFreeCount to allow for the next send to occur. In case of a timeout error, CAL transmits preferably are retried some number of times as appropriate until the send is successful or is abandoned after some maximum retry count is reached.

Transmit timeouts for raw data fragments are handled in a manner similar to CAL transmits except that, in some cases (depending on the nature of the raw data stream and what is expected on the receiving side), additional retry handling can be required. Raw stream fragments typically use packet sequencing to aid in managing the data stream. Depending on the requirements of the raw stream receiving application, it may be desirable for the timeout handling code to retry not only the transmit that timed-out, but also any additional pending raw transmits (those with higher sequence numbers) regardless of whether these pending transmits end up being successful or not. This helps insure that the receiving application or routing handler will receive packets in order of ascending sequence. The receiving app/router need to deals with out-of-order sequences by dropping them.

The CAL request/response and raw stream packets are queued by the ISR handler and processed later by the Receive Payload thread and appropriate Payload/Protocol Handler.

Special handling is also used with CAL packets to verify that no new CAL requests are sent to a remote node for which a CAL response is pending. Also, if a CAL request is received from a remote node, typically, no new CAL packets are allowed to be sent to that node until after an appropriate CAL response is sent.

For legacy control network device drivers (such as the X-10 driver 328 and the CEBus driver 332), the shims 323, 330 provide an interface which allows these non-PLX drivers to operate with the gateway 300. On transmit, the shims 328, 330 examine CAL packets sent by the dispatcher 320 and convert these packets into the equivalent format recognized by the underlying legacy driver/device. On receive, the shim 328, 330 convert the received legacy data into CAL format, build a DCB, and passe the DCB up to the dispatcher 320.

During the send and receive process, the shims 328, 330 typically perform some address translation by converting the 4-byte DCB addresses to the address format used by the underlying legacy driver.

Received packets can contain CAL control messages or raw stream data (which might include printer data, tunneled Ethernet/ADSL data, etc.). Each of these payloads are handled by an appropriate payload/protocol handler provided by the payload/protocol processor 312. The CAL handler 318 contains a CAL interpreter that is responsible for parsing and processing CAL request/response control packets received from control network nodes. The Payload Handler thread passes a CAL packet from a client on to the CAL handler for further processing. The CAL interpreter also provides some basic CAL parsing routines to the other gateway components that deal with CAL messages.

When the dispatcher 320 calls the CAL handler 318, it passes, among other things, a pointer to the CAL message, the address of the client that originated the packet, and the address of the client to be acted upon. These two addresses are typically the same except in those cases where the packet originates from the application 302.

The CAL messages are classified as either command (also commonly referred to as request) or response messages. The CAL commands from client nodes are usually state change notifications that tell the gateway 300 something to the effect of "set my state variable to some new value." Special function clients, such as those being controlled by an application 304 also send CAL Commands to Get or Set the state (instance) variables of other clients, based on user requests. These packets typically require special handling described in the next section. The CAL command packets may contain one or more commands.

Single command CAL packets are of the form:

<contextID><object#><method/macroID>[<IV>[<arguments>]]

The CAL interpreter breaks the message into its components, mapping the method identifier into the appropriate database access method that is then called with the ID and argument parameters. The database access methods 306 perform the requested operation and, if an IV has changed, the rules engine 314 is notified. The rules engine 314 evaluates any rules that apply on the changed IV and, if warranted, event notification/actions are scheduled through the event handler 310 as described above.

The CAL Response packets are used by client nodes to respond to CAL Commands. A CAL response is of the form <status token>[<returned data>], where the <status token> is a one byte indicator of the type of response (COMPLETED, FALSE, or ERROR), and the <returned> data is any data returned as a result of the command message.

When one of these packets is received, it is associated with the original CAL command/request. This association is relatively easy when a client responds immediately to a request. The association is more complicated when the response is delayed. What makes the association possible is the fact that a client may not send a CAL request packet on the network until it has sent a response to a previous request. The gateway 300 does not send a request to a client that is in "delayed" mode. This allows the gateway 300 to store, per client, the last request (or command) sent to the client. When a client response is received, this information allows the CAL handler 318 to determine what to do with the returned information.

The raw data handler 316 processes non-CAL receive data. The gateway 300 supports multiple, concurrent data streams which can originate in a variety of applications. The way in which the raw data handler 316 differentiates between raw data streams involves a socket field, where a unique socket number is associated with each raw data stream type. Examples of raw data streams include ethernet/ADSL network packets, printer data, voice streams, and the like. The raw data handler 316 does little parsing of the raw data other than to examine the socket number. The packet data and associated DCB is then passed to the routing handler 355 responsible for that socket number.

Routing handlers 355 provide the functionality enabling the gateway 300 to redirect network data traffic from legacy data networks (Ethernet, ADSL, Token-Ring, etc.) to a desired network. For example, using the gateway 300 to redirect network data traffic from a legacy network to a network such as a PLX power-line network provides many desirable features including, but not limited to: 1) allowing a traditional ethernet network to be extended to include power-line based nodes without the need for additional ethernet cabling; 2) allowing broadband data to be distributed over the power-line; 3) allowing proxy server capabilities for power-line based network clients; 4) allowing tunneling of legacy protocol stacks (TCP/IP, PX/IPX, NetBEUI, etc.) over the power-line.

An important task performed by the routing handlers 355 is address translation. During initialization, the routing handlers 355 obtain the 4-byte address used as the srcDevAddress in transmit DCBs originating from the gateway 300. The routing handlers 355 translate this address into a form suitable for the legacy stacks and/or drivers that the handlers are communicating with.

The following section describes the method used by routing handlers 355 to tunnel legacy network data packets over a different protocol (e.g., the PLX protocol) using DCBs. To tunnel is to encapsulate or wrap a packet from a first protocol inside a packet for a second protocol. The wrapped packet is then transmitted over a network via the second protocol. Upon arriving at its destination, the wrapped packet is unwrapped and to reveal the original packet from the first protocol.

During initialization, the routing handlers 355 set up address mapping/translation tables as discussed previously. The routing handlers 355 are also aware of the maximum packet/fragment size supported per DCB. The routing handlers 355 obtain this information from the dispatcher 320. The various routing handlers 355 are identified by using socket numbers. Well-known socket addresses can be reserved for exclusive use or obtained dynamically during initialization.

When the route handlers 355 get a send request from a legacy stack or driver that is destined to a power-line device, the routing handlers 355 break the send data into fragments which are no bigger than the maximum supported DCB data size. DCBs are then created and sequence numbers are assigned to each fragment. The first fragment is always sequence 0 and last fragment has the high bit of the sequence set. Optionally, the routing handlers 355 can add a checksum to the packet if this functionality is not adequately provided at another level. These DCBs are then handed to the dispatcher 320 for queuing on the raw send queue. This wakes up the raw send thread, which hands the DCBs to the appropriate device driver for transmission onto the power-line.

As each transmit is completed by a device driver, a Tx status is marked in a DCB and the DCB is returned to the routing handler 355. After all DCBs have been returned, the routing handler 355 performs send-complete operations required by the legacy protocol. Since timeout/retry issues are handled by the dispatcher 320, and device drivers, and in many cases, by the legacy stack as well, the routing handlers 355 can choose not to perform any additional retry operations.

Receive handling is a bit more complicated since it is possible for the routing handlers 355 to receive fragments concurrently from multiple senders. Also, in some cases, fragments might be received out of order or fragments may be dropped. The routing handlers 355 have a receive module that is able to handle all of these possibilities. Typically, as a beginning DCB/fragment is handed to one of the routing handlers 355 by a payload/protocol handler 316, the DCB/fragment is placed on a receive queue reserved for the sending address. As each DCB is received, the receiver checks for the last fragment sequence or for a receive timeout.

When all fragments have been received and have passed integrity checks, the routing handlers 355 perform the steps required by the legacy protocol/driver to indicate a receive event. This will typically involve re-assembling the packet and possibly copying the relevant receive data into buffer(s) provided by the legacy module 352. After the described by each receive DCB has been processed, the DCBs are returned to a free DCB list.

The gateway foundation classes 304 are based on object-oriented concepts (e.g., Java, C++, smalltalk, etc.) and provide a way for various types of applications to access and manage node information stored in the node database 306, the rules engine 314, the event handler 310, and other services provided by the gateway 300. This allows the end-user application 302 to provide a wide range of useful features to the end user. For example, gateway foundation classes 304 enable standalone applications and Java browser applets to enumerate, monitor and control nodes described in the node database 308. These applications/applets can define various bindings between nodes by defining simple or complex rules using the Rules Definition Language. The application 302 can also be made aware of database changes as they happen by registering itself as an event notification target.

Although the foregoing has been a description and illustration of specific embodiments of the invention, various modifications and changes can be made thereto by persons skilled in the art, without departing from the scope and spirit of the invention as defined by the claims following Appendix A.

Appendix A

The PLX protocol is a low-cost, easy to use, flexible, reliable, and scalable network architecture/protocol that allows multiple smart and dumb nodes to communicate via a common data/control channel. The networking protocol allows any node on the network to assign itself as the active network server. The active network server polls client nodes based on a lineup card. Inactive nodes are automatically removed from the lineup card, thus reducing unnecessary polling traffic. This architecture reduces collisions while preserving bandwidth for actual data transmission. Support for both control and data networking needs is provided by the protocol. Support for streaming data or asynchronous data is provided by allocating time slots on the network and allowing two intelligent nodes to talk directly to each other as arbitrated by the active network server. The active network server can also allocate separate data channels such that large amounts of data traffic can flow independently of the operations of the main network. The network node serving as the active network server can be changed on a dynamic basis, and is typically determined by the first node initiating a transmit request on a sleeping network. Client nodes are addressed by dynamic-polling using an address isolation scheme.

The PLX architecture, which includes the PLX protocol, is well suited to networks that use the existing electrical power wires (power lines) in a building as the network medium. The use of existing power lines to transmit data means that the user does not need to install a network cable.

The PLX architecture provides robust, deterministic, media accessibility for the network nodes. Nodes are addressed by dynamic polling using an address isolation scheme. A viable data channel is provided for use in diagnostics, argument passing, and generic data passing applications.

In one embodiment, the PLX protocol provides globally unique identification codes, node profiles, and 32-bit virtual addressability. This makes the PLX protocol compatible with plug-n-play type networks.

In one embodiment, the PLX architecture provides features such as peering, multiple servers, simple configuration, security, datagram detection, multiple data formats, and prioritization schemes. Error detection, such as CRC and checksums, and data integrity capabilities are part of some embodiments of PLX. The PLX architecture provides for smart nodes and dumb nodes and the architecture provides for data transactions ranging from simple control to complex data streaming.

In one embodiment, PLX is implemented by state machine logic or a micro-controller. A streamlined low-end node (dumb node) can be implemented to use a subset of the full PLX capabilities. Mid-range nodes, such as appliances, fit within the protocol disclosed herein. Higher-end nodes (smart nodes), such as PC's, PBX's, intercom/surveillance systems, printers, mice, and other data-intensive nodes also find applicability within the PLX architecture.

The PLX protocol defines rules of operation for a data link layer, a network layer, and a transport layer. In one embodiment, PLX includes a Media Access Control (MAC) portion of the data link layer. The MAC protocol is the set of rules that govern how and when the physical medium can be accessed by each node. In one embodiment, the MAC protocol uses a dynamic centrally distributed token passing architecture that reduces collisions on the power line.

The PLX architecture allows any node on the network to assign itself as the active network server, which is responsible for arbitrating requests for the token. When nodes are inactive, they go into a "sleep" mode, thus eliminating any unnecessary "polling" traffic. This architecture reduces collisions while preserving precious bandwidth for actual data transmission.

The PLX architecture is, in many respects, a client/server networking architecture that support packets for both control and data networking needs. Support for streaming data or asynchronous data can be supported by allocating time slots on the wire and allowing two intelligent nodes to talk directly to each other as arbitrated by an active network server. The active network server can also allocate separate data channels such that large amounts of data traffic can flow independently of the operations of the main network. The network node serving as the active network server can be changed on a dynamic basis, and is typically determined by the first node initiating a transmit request on a sleeping network. Additionally, the active network server is selected independently of the application server. The application server is typically a fixed node location. The active network server can be any server-capable node.

In one embodiment, PLX provides combined media access capabilities, including a datagram sensing algorithm for initial access onto an inactive (sleeping) network medium, followed by centralized token passing for insertion onto an active network. This effectively couples multiple access with a collision-free, token-passing type environment, with the added benefit of determinism. In one embodiment, PLX uses the presence of a datagram to determine initial media accessibility. The datagram is specifically detected by matching a specified preamble/length sequence combination.

In one embodiment, PLX reduces traffic on the network by using a centralized dynamic polling algorithm that only passes tokens to active nodes on the system. Once a node becomes inactive, the node is removed from the polling list. This selective polling process is based on the ability of nodes to insert themselves into the polling list through a process known as "spitting on the bus."

The spitting process provides real-time, on-the-fly, insertion into the polling list. The spitting process allows multiple node responses to be viewed as a single system response. This system response allows the active server node (the node that is doing the polling) to further isolate the specific node requesting insertion into the polling list.

Real-time, on-the-fly de-insertion from the polling list is provided by an aging process. Inactive nodes are eventually removed (de-inserted) from the polling list if, after a predefined period of time, they do not use the token. In one embodiment, the aging process is further expedited if a node fails to respond to a token request.

In one embodiment, the polling list is set to a fixed size (number of nodes) based on the bandwidth capability of the medium. Nodes carrying lower priority data (such as control data for a lighting system) are removed from the polling list in order to make room on the list for nodes having higher priority data (such as streaming audio/video data).

In one embodiment, the Media Access Control (MAC) layer in the PLX architecture provides a self-throttling mechanism by using a spare receive buffer and BUSY response handshake. In one embodiment, self-throttling is accomplished by providing a MAC header and a receive area large enough to hold a copy of the MAC header in each node. Even if a node is completely swamped with previous packet requests, the swamped node is still capable of responding to a request by producing a BUSY response. The BUSY response informs the transmitting node that it must hold-off on its packet burst or sequence, thus pacing the system according to the capabilities of each receiving node.

A node auto-announce feature upon power-up provides re-synchronization of remote database servers. Upon power-up of a new node, the new node will announce it's newly arrived presence on the medium.

In one embodiment, PLX provides preferred server selection and kick-start algorithms. Since PLX is a client/server type of architecture, a single node is typically selected to arbitrate media access. On a typical power line network, all nodes are not necessarily created equal. Thus, one embodiment of PLX allows a user to select a node that is most centrally located (i.e., near a breaker panel) to act as the preferred "active network server." If the preferred server is inactive, remote nodes can activate the preferred server. A simple wake-up algorithm allows an inactive preferred server to become active again.

Initially, a node acquires the token to access the medium in a client/server model. Once a client node is given the token, it may take over the medium for a specified amount of time. During this time period, it may communicate with any node on the system directly, independent of the server's involvement. At the end of this period, media access control is relinquished back to the server node. Thus media arbitration is done first in a client/server fashion, followed by a peer-to-peer time slot.

In one embodiment, PLX includes a dynamic media arbitration server. The server that arbitrates access to the medium is dynamically assigned based on activity. This dynamic assignment occurs when the first node with a packet to transmit, recognizes that the system is "inactive" and after several attempts to wake-up a preferred server (if one exists), assumes the role of active network server. Any server-capable node on a PLX network can become the active network server.

In one embodiment, the present network protocol provides for sending and receiving streaming data across a power line medium. In one embodiment, the streaming data includes digital voice data. In one embodiment, the streaming data includes digital video data.

In one embodiment, the network protocol is used to provide digital PBX-type functionality and/or digital intercom functionality across a power line medium. The network protocol can be used to extend broadband digital networking services (e.g., DSL, Cable, ISDN, etc.) throughout a home over the existing power lines in the home.

The network protocol can simultaneously handle and manage three or more types of networking traffic: control traffic; data traffic; and streaming data traffic (streaming multimedia data). The network protocol provides prioritization schemes to allow guaranteed access times depending on the networking requirements of a given node (such as a requirement for determinism for voice devices).

The PLX OSI Model

Each of the top five OSI layers 203-207 shown in FIG. 2 adds significant overhead to a network application. As shown in FIG. 3, PLX uses a relatively thin application layer 607, called the Common Application Language (CAL) and a relatively thin transport/network layer 603 to complement the underlying data-link layer 602 and physical layer 601. Each of the layers 601-603 and 607 are typically present in PLX compliant nodes. As shown in FIG. 3, PLX data networking nodes (smart nodes) may also include conventional OSI network capabilities (e.g., TCP/IP, IPX, Windows, NetWare, etc.) in the application layer 207, the network layer 203 and the transport layer 204. PLX compliant nodes typically contain a reduced amount of control information, which is passed between PLX nodes using only the PLX stack, as embodied in the layers 601-603 and 607.

The PLX Physical Layer

The PLX physical layer 601 handles the hardware details of physically interfacing with the network hardware, the network cable, and, typically, includes the actual hardware itself. The physical layer includes such attributes as modulation technique, frequencies used, power output, etc. In one embodiment, PLX uses Digital Power-Line (DPL) technology as described below.

The PLX Data-Link Layer

The PLX data-link layer 602 handles the details of interfacing with the medium 100, such as addressing capabilities, media arbitration schemes, inter-gap spacing, back-off algorithms, and so forth. The data-link layer 602 typically includes a header that contains source/destination addresses, lengths and error detection/correction data such as Cyclic Redundancy Check (CRC) or checksum data.

The PLX Network Layer

The network/transport layer 603, sometimes called the internet layer, is responsible for routing packets of data from one place to another on the network. Within PLX, the network layer 603 is typically handled using system, individual node, socket, and network address fields within a MAC header field.

The PLX Transport Layer

The PLX network/transport layer 603 provides a flow of data between two hosts for the application layer 607 that resides above it. The transport layer 603 also contains sequence numbers and/or request/response type acknowledgment information. Within PLX, the transport layer 603 is scaled down and streamlined, as compared to the OSI transport layer 203, to allow for control applications. The transport layer 603 provides request/response hand-shaking algorithms, retry algorithms, timeout algorithms, and the like. PLX implements the network/transport layer 603 almost entirely within a control field of a MAC header.

The PLX Application Layer

The PLX application layer 607 handles the details of the application and depending upon which transport is being used, the application layer 607 can use a hand-shaking protocol and/or a request/response protocol to ensure packet delivery. A considerable amount of duplication of fields exist within the protocols of the OSI layers. This duplication translates into more overhead, uses more space, and requires additional processing power. In the PLX protocol, many of the OSI fields are not needed and are typically omitted.

Examination of the various components included in the various OSI protocols reveals that, the data-link layer 602 can do much of the filtering without the upper three layers. This filtering is beneficial, because the data-link layer 602 is often typically confined to hardware logic that also takes care of hardware issues, such as multiple nodes contending for the same communication channel (e.g., multiple network cards contending for the same network wire). In one embodiment, the network hardware for a specific network node filters everything except for the data packets destined for that specific network node. Under such a system, node need only parse the data portion of a data packet.

Two Protocols for DPL

Two protocols are preferably defined by PLX for use on a Digital Power Line (DPL); a low-level protocol and a high-level protocol.

Low-level Protocol Definition. The low-level protocol provides a definition of the data-link layer 602 and how packets are filtered, sent, and received from the same medium 100 with relatively few networking and transport functions.

High-level Protocol Definition. PLX nodes contain a reduced amount of control information. Each PLX node uses a common application layer 607 for controlling the particular node attributes. This allows the PLX system to be characterized regardless of node types. The application layer 607 deciphers or parses the control information after the hardware header is stripped off.

The Physical Layer: Digital Power-Line (DPL) Specification

The PLX protocol is a versatile protocol that can be used with many types of network media (i.e. data transmission systems) including optical transmission, fiber-optic transmission, radio-frequency transmission systems, twisted-pair transmission systems, coaxial transmission systems, satellite systems, digital power line (DPL) systems, etc.

DPL systems, also known as power-line carrier systems, use the power supply wiring (e.g., the standard 110 Volt Alternating Current (VAC) circuits in a building) to carry digital data. In one embodiment, the PLX protocol is used in connection with a DPL having a single low-speed channel (350-1000 kbps), a low-speed carrier frequency at approximately 5.6 MHz, approximately 80 dB dynamic range or better, low bandwidth usage (dependent on speed, but around one MHz).

In one embodiment, the PLX protocol is used in connection with a DPL having multiple high-speed channels (totaling 4-8 mbps), high-speed carrier frequencies up to 30 MHz or more, and approximately 80 dB dynamic range or better.

On a typical DPL system, the transmit carrier is typically enabled at least 20 microseconds before data and the time between disabling the transmitter, until the receiver detects no carrier, can be 15 microseconds or longer The Low-Level Protocol Layer: The PLX Specification The PLX protocol is scalable for applications ranging from simple control to complex data-streaming networks. In one embodiment, the PLX protocol is adapted to leverage most of the features of the Generic Common Application Language (CAL) specification. CEBus, defined in EIA-600, is an industry standard control language for controlling bus devices. EIA-600 provides a skeleton for a Common Application Language for use within home LANs. Generic CAL is defined in the EIA-721 series of standards (including EIA-721.1, EIA-721.2, EIA-721.3, and EIA-721.4). The CEBus Industry Council (CIC) has defined a Home Plug & Play (HPP) specification that fleshes out that skeleton by defining the "grammatical" rules for using the language.

The HPP specification details a set of behavioral characteristics for products and systems within the home that will allow them to take actions based upon the state of the home. For example the specification identifies different conditions within the home such as "occupants away" or "occupants home and asleep" to allow home systems to take appropriate action like arming the security system, shutting off interior lights, or setting the temperature. The HPP specification also includes information for developing Windows '95 PC-based applications for home control.

The Common Application Language defined within EIA-600 provides a framework for communication among home LAN products produced within divergent industry sectors (e.g., entertainment, computers, heating/cooling, kitchen appliances, etc.).

Each industry sector defines the "application contexts" (i.e., grammatical rules) under which its products will use the language. The CIC was created to serve as the support organization that helps divergent industry sectors develop "harmonious" application contexts. CIC's HPP is a compendium of harmonious application contexts for those industry sectors pursuing the home LAN market with CAL based interoperable products.

The CEBus/Generic CAL specification is hereby incorporated by reference in its entirety.

Media Access Overview

PLX can be characterized as a Datagram Sensing Multiple Access protocol with a Centralized Token-Passing scheme, or DSMA/CTP. Because multiple peers are allowed to access the same physical medium 100, PLX sets forth a common set of rules for each node to use when attempting to place data on the medium 100.

PLX integrates several features from a diverse number of protocols to create a single, efficient, deterministic environment. PLX provides datagram detection. Each PLX node can "sense" the medium 100 for traffic, and assert itself if the medium 100 is currently dormant. Collision avoidance is provided via an organized token passing-type mechanism. PLX includes a method for selecting a single, central, arbitration node to handle access to the medium. The central node (active server) is responsible for ensuring a token is present on an active system. PLX uses selective dynamic polling to provide simplicity of design, ease of implementation, collision-free access, systematic acceptance and subsequent relinquishment of the token, and an acknowledgement sequence for reliable delivery of data (request/response).

PLX provides an ability to have a "quiet" medium 100 when the nodes are "inactive". Typically, in PLX, only "active" nodes communicate on the medium 100. PLX also provides a global addressing scheme for plug-n-play ability, and an algorithm to isolate multi-node contention for the medium 100.

PLX also provides time determinism, or guaranteed time slots, for streaming applications, and reduced cell lengths (packet lengths) for quick turn-around times.

PLX provides multirate support, hot swapping, authentication and security, control and management packets.

Additionally, PLX provides many control networking features in the higher-layer protocols. As a result, the media access methodology has been highly polished utilizing many advantageous features of various topologies.

Media Access Methodology

The media access methodology outlines the rules involved in gaining access to the medium 100. The PLX method for gaining access to the medium 100 typically involves three events;

1. Datagram Detection or "Listening";
2. Spitting on the Bus; and
3. Centralized Token Passing.

Nodes are characterized with respect to the token present on the system as either the active network server node or as a client node. On a PLX system, initial access to the medium 100 is done by listening for activity, then self-assertion as the active network server, and finally systematic, centralized token-passing by the active network server.

FIG. 5 is a flowchart that shows the media access algorithm used by PLX to arbitrate which node is allowed to "talk" on the medium 100. The flowchart in FIG. 5 begins with a power-up and announce process block 801, wherein each node, upon power-up, announced its presence on the medium 100. Upon completion of the announce, the process advances to a decision block 802. The node loops (idles) in the decision block 802 until a transmit (Tx) ready command is received, whereupon, the process advances to a decision block 803. If, in the decision block 803, the node is not on the lineup card or is the active server, the process advances to a datagram detection block 804; otherwise, the process advances to a decision block 816. In the decision block 816, if the node has received the token, then the process advances to a transmit packet block 814; otherwise, the process advances to a timeout decision block 810. In the decision block 810, if a timeout has not occurred, then the process returns to the decision block 816; otherwise, the process advances to the datagram detection block 804. In the transmit packet block 814, the process sends a transmit packet and advances to a polling block 815. In the polling block 815, the active network server polls the active nodes, as described in connection with FIG. 7, or returns if the node is a client. Upon completion of the polling block 815, the process advances to the decision block 802.

In the datagram detection block 804, the node listens to the medium 100 for a specified time period and then advance to a decision block 805. If the medium was awake during the listening period of the process block 804, then the process advances to a LIP request decision block 806; otherwise, the process advances to a process block 812. In the process block 812, the node sends a "wake-up" packet and advances to a decision block 814. In the decision block 814, if three wake-up packets have been sent without obtaining a response, then the process advances to a self-assert block 813; otherwise, the process returns to the datagram detection block 804. In the self-assert block 813, the node asserts itself as the active server node and the process advances to the transmit packet block 814.

In the LIP request decision block 806, the process checks for the presence of a LIP request. If no LIP request is present, the process advances to a timeout decision block 809, otherwise, the process advances to a process block 807. In the timeout decision block 809, the process checks to see if a specified packet timeout period has elapsed. If the period has elapsed, then the process returns to the decision block 802; otherwise, the process returns to the LIP request decision block 806.

In the process block 807, the node spits on the bus and then advances to a decision block 808. In the decision block 808, the process checks to see if the node has been drafted. If the node is drafted, then the process returns to the receive token decision block 816; otherwise, the process returns to the LIP request decision block 806.

The blocks 802, 803, 810, and 814-816, are part of a centralized token passing algorithm. The blocks 804, 805, and 811-813, are part of a datagram detection (listening) algorithm. The blocks 806-809 are part of a spitting on the bus algorithm.

As shown in FIG. 5, initial access to the medium 100 is accomplished in one of two different ways depending on whether the medium 100 is "sleeping" or "awake." If the medium 100 is sleeping, a node desiring access will self-assert itself as the active server. If the medium 100 is active (that is, being used by an active network server), then a client node desiring access will ask the active network server for access. The active network server maintains a lineup card of client nodes that have requested access. A client node asks to be placed on the lineup card through a process known as "spitting on the bus".

Typically, any server-capable node can assert itself as the active network server, however, it is not a requirement to contain server-capable attributes within a given node.

Once an active network server is selected, it must be capable of creating and maintaining a "lineup card" which contains a list of active nodes to be polled. When all of the active nodes have become inactive (through an aging process), the active network server relinquishes its current status as the active server and the medium 100 becomes dormant (sleeps) again. Typically the active network server is self-appointed by a node which has something to transmit onto the medium 100.

Active nodes are removed from the lineup card when the node has been silent for a period of time. Active nodes are also removed from the lineup card when a node with higher-priority data needs access to the lineup card. The lineup card typically has a maximum number of slots. In other words, the lineup card has a maximum number of nodes that can be entered on the lineup card. The number of slots is usually determined by the bandwidth available on the medium 100 and the bandwidth needed by the various network nodes. If N is the maximum number of slots in the lineup card, and t is the maximum amount of time (in milliseconds) that a particular active node is allowed to keep the token, then an active node will get the token at least approximately once every N*t milliseconds. Thus the lineup card provides determinism, in that an active node will get polled on a regular, predictable, basis.

For example, streaming video data has a higher priority than streaming audio. Thus, if N streaming video nodes are already entered on the lineup card, a streaming audio node requesting entry onto the lineup card will be refused. The streaming audio node will, however, be given the token each time it requests entry onto the lineup card. This illustrates one of the attributes of the lineup card. Nodes that are listed on the lineup card are automatically polled, and will thus get the token on a regular basis without having to ask for the token. Nodes that are not listed on the lineup card receive the token only after making a request for the token or a request to be placed on the lineup card.

The priority of the data provided by a particular network node is determined by the network_class field described in connection with the Node Profile Object described below. The network_class for a particular node is also found in the highest four bits (the device_type field) of the node address.

Node Semaphores

Each PLX node manages two local semaphores that reflect the current state of the system, and the node's involvement within the system. These semaphores help nodes determine whether or not the listening process needs to be initiated. Typically, nodes manage these two semaphores, since they are used to gain access to the medium 100 (when the node has something to transmit).

The first semaphore reflects the "system state." The system state is either "awake" or "asleep", depending upon whether or not the medium 100 is active (i.e., packets are seen on the medium 100).

The second semaphore is termed the "local node state." The local node state reflects one of three possible states for a node, as follows: (1) the node is an active network server node; (2) the node is an active client node, or (3) the node is an inactive client node. The local node state determines whether a node should initiate the listening algorithm, whether the node is currently on the lineup card (being polled), or whether the node is currently the active server.

The "System State" Semaphore

Each node makes individual decisions on whether the system is awake or asleep. This decision is based on the presence of Lineup Insertion request Packets (LIP) on the medium 100. When a node sees a LIP packet, the system state semaphore becomes awake. If after a period of time, LIP packets are not seen, the node toggles the system state to asleep. This means, if an active network server exists, it should periodically transmit LIP packets to keep client nodes awake.

A node uses this semaphore to determine whether or not it must listen to the medium 100. Only when the system state is asleep will a node need to contend for the medium 100 through a listening process.

The "Local Node State" Semaphore

The active network server will continue to distribute tokens (poll) a client node currently on its lineup card for one to ten seconds after the last transmission by the client node. At this point in time, the active network server determines that the node is through transmitting and "ages" the client node off of the lineup card. The client node must be capable of detecting this. When the client node is currently receiving tokens, it is deemed active. When the client node is not currently receiving tokens, it is deemed inactive. An inactive client can only transmit onto the medium 100 after being inserted into the lineup card by the active network server, through a process termed "spitting on the bus." Listed below in Table A1 are the possible node semaphore states and what each state means in terms of transmitting on the medium:

TABLE A1

| Next action for a node with a new transmit ready. | | |
|---|---|---|
| System State | Node State | Next Transmit Action |
| AWAKE | ACTIVE | On the Lineup Card: Wait for Token |
| AWAKE | INACTIVE | Off the Lineup Card: Spit on the Bus |
| ASLEEP | ACTIVE | Bad state: Listen, then assert as server |
| ASLEEP | INACTIVE | Listen, then assert as server |

Datagram Detection or "Listening"

The system state semaphore discussed above, is the primary factor in determining whether a node should begin listening or not. It is also the primary factor in determining whether or not the node should assert itself as the active network server or whether it would take a submissive role as a client. Typically, listening is only performed prior to initial transmission onto a sleeping system. If any node is transmitting on the medium 100, an active network server has already been selected to send LIP packets and to arbitrate token distribution, and the system is awake. The node should act as a client if the system is awake.

When a node determines that it has a packet ready to be sent onto the medium 100, and the system state semaphore is asleep, the node goes through a listening process to determine its next step and to minimize collisions during this initial process. This should be the only period of time on a PLX network that two nodes could contend for the medium 100, and possible unseen collisions could occur. Thus, a robust back-off algorithm is provided.

There are two possible cases to address in listening: (1) The node was just powered on and needs to transmit its "announce" or "CAL-ping" packet to announce its addition to the current system; or (2) the node was inactive and is trying to wake-up the system. In either case, if a server is detected while listening, the node should immediately begin searching for a LIP packet. A LIP packet will enable the node to insert onto the active network servers lineup card, and subsequent token passing and node transmissions.

Initial "Listen/Ping" Announcement

As soon as a node is powered up, it announces its presence on the system by transmitting a broadcast CAL-ping packet. This allows the auto-discovery mechanism to be more robust, by "pushing" the information instead of always trying to "pull" it. Since the node that was just powered on, has no history regarding the system, its listening algorithm is slightly different than a normal wake-up process.

The initial listen could take as long as 800 ms before broadcasting a CAL-ping packet. This is done by actually listening for traffic for a defined period of time, then randomly during that time period, transmitting a broadcast wake-up packet three times to allow a preferred server the opportunity to poll this node if it exists. This sequence is repeated three times, at the end of which, a CAL-ping packet is broadcast to all nodes signifying successful entry onto the system. The sequence for the listen/ping process is given in pseudo-code as follows:

1) a) listen to the medium 100 for a random amount of time less that 125 ms (look for a LIP packet).
   b) Transmit a broadcast wake-up packet three times with 600 us inter-gap spacing.
   c) Continue listening to complete a full 125 ms time period.
2) a) listen to the medium 100 for a random amount of time less than 125 ms (look for a LIP packet).
   b) Transmit a broadcast wake-up packet three times with 600 us inter-gap spacing.
   c) Continue listening to complete a full 125 ms time period.
3) a) "listen" to the medium 100 for a random amount of time less than 125 ms (look for a LIP packet).
   b) Transmit a broadcast wake-up packet three times with 600 us inter-gap spacing.
   c) Continue "listening" to complete a full 125 ms time period.

-continued

4) Assert as the active network server and transmit a broadcast "CAL-ping" packet to signify presence.
5) De-assert as the active network server.

The above listen/ping process takes place once after the node is powered up, and therefore the latency time that this process takes is typically not significant. The run-time wake-up process, described below, is executed more often and thus desirably has a smaller latency time.

The Run-time "Listen/Wake-up" Sequence

Once a node has powered up and announced its presence on the system, it begins to operate in a run-time mode. If, during its run-time mode of operation, a node needs to transmit a packet onto a sleeping system, it goes through a similar sequence of events to try and wake-up a preferred server. If a preferred server does not exist, and no active network servers are present, then the node asserts itself as the active network server and begins polling client nodes. A pseudo-code listing for the listen/wake-up algorithm is given below. In addition to the algorithm given below, for quicker response times, the node can alternatively monitor the medium 100 and use the local node semaphores to reflect the system state. The local node semaphores are used in connection with a wake-up packet to further reduce latency associated with this process.

1) a) Listen to the medium 100 for a random amount of time, typically less than 125 ms (look for a LIP packet).
   b) Transmit a broadcast wake-up packet three times with 600 us inter-gap spacing.
   c) Continue "listening" to complete a full 125 ms time period.
2) a) Listen to the medium 100 for a random amount of time, typically less than 125 ms (look for a LIP packet).
   b) Transmit a broadcast wake-up packet three times with 600 us inter-gap spacing.
   c) Continue listening to complete a full 125 ms time period.
3) a) Listen to the medium 100 for a random amount of time, typically less than 125 ms (look for a LIP packet).
   b) Transmit a broadcast wake-up packet three times with 600 us inter-gap spacing.
   c) Continue listening to complete a full 125 ms time period.
4) Assert as active network server and transmit next packet accordingly.
5) De-assert as the active network server.

Spitting on the Bus

The "spitting" process takes place when a node on the system has a packet ready for transmission, and the system is awake (an active network server exists and is currently distributing tokens). The active network server is the only node authorized to permit access onto the medium 100. The active network server's lineup card is the mechanism whereby inactive client nodes can gain access to the medium 100. The nodes spit to get into the active network server's lineup card.

During typical run-time operation, the network will appear in one of two states: either sleep or awake. The spitting process is slightly different depending on which state the network is currently in.

Sleep and Awake States

The network goes into a sleep state when the active network server determines that there are no nodes currently requiring service (packet to transmit), and as a result, stops transmitting tokens. Prior to signing off the network, the active network server sends a series of masked Group LIP (LIPG) request packets for a specified period of time. If the series of LIPG request packets elicits no responses from any of the client nodes, the active network server becomes inactive, and the network goes into a sleep state. Subsequent entry onto the network by nodes requesting to transmit, is then accomplished through the normal contention handling, listening algorithm described above.

The awake state symbolizes nodes on the designated network that are actively exchanging information with one or more remote nodes. In the awake state, media access is controlled by the active network server and its lineup card. Collisions are reduced by using a token-passing scheme for nodes currently on the lineup card and through spitting for nodes attempting to get onto the lineup card.

The "Spitting on the Bus" Sequence

The sequence for spitting on the bus allows the active network server to periodically transmit a LIPG packet. Sleeping client nodes are allowed to respond to the LIPG packet. Once a response is seen, the active network server transmits an unmasked LIPD request to all nodes, hoping for a single response with the address of the node desiring the token. If more than one node is contending for the token, the response will not be seen, and the active network server goes into a node isolation sequence.

Figure 6:
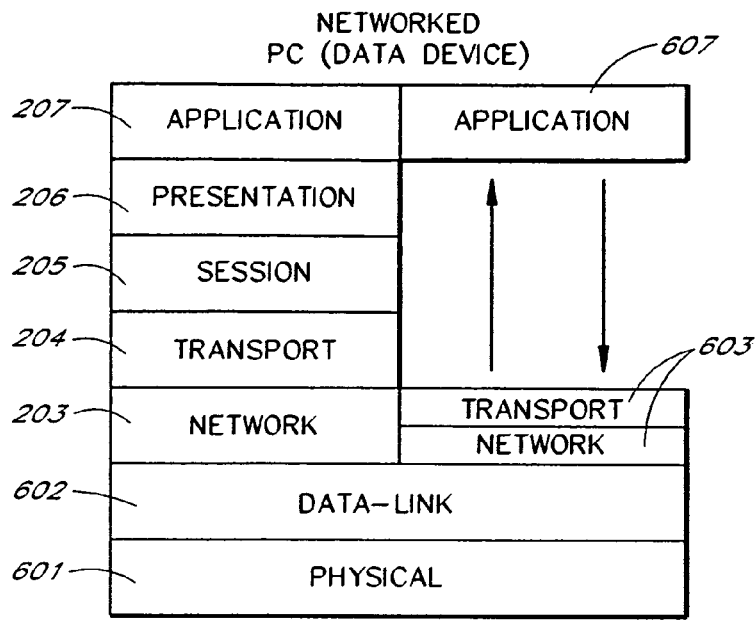
FIG. 6 is a block diagram of a PLX network model for a smart device.

FIGS. 6A and 6B illustrate the process of spitting on the bus for an active network server and client node, respectively. In FIG. 6A, the process of spitting on the bus for an active network server begins in a start block 901 when a node becomes the active network server. The process advances from the start block 901 to a polling block 902. In the polling block 902, the active server polls all of the client nodes currently on the lineup card. Once the polling is complete, the process advances to a transmit block 903. In the transmit block 903, the active server node transmits an unmasked LIPG request and then advances to a decision block 904. In the decision block 904, the active server looks for a LoGI response. If a LoGI response is received, then the process advances to a process block 905; otherwise, the process returns to the polling block 902.

In the process block 905, the active server transmits an unmasked LIPD request and then advances to a decision block 906. In the decision block 906, the active server looks for a Direct ACK (DACK) response. If a single DACK response is received, then the process advances to a process block 907. If multiple DACK responses are received, or if no DACK responses are received, then the process advances to a node isolation block 910. In the process block 907, the client node that sent the DACK response is added to the lineup card, and then the process returns to the polling block 902.

In the process block 910 (beginning the node isolation algorithm) the process initializes an LIPG mask and advances to a process block 911. In the process block 911, the mask is updated (e.g., a next bit in the mask is toggled) and the process advances to a transmit block 912. In the transmit block 912, a masked LIPG request is sent and the process advances to a decision block 913. In the decision block 913, the process looks for a LoGI response. If a LoGI response is received, then the process advances to a decision block 915, otherwise, the process advances to a process block 914. In the process block 914, the mask bit most recently toggled in the process block 911 is un-toggled and the process advances to the decision block 915.

In the decision block 915, if all bits in the mask have been toggled, then the process advances to a process block 916; otherwise, the process returns to the process block 911. In the process block 916, the active network server transmits a masked LIPG request and advances to a decision block 917.

In the decision block 917, if a DACK response is received, then the process advances to the process block 907; otherwise, the process returns to the polling block 902.

The process blocks 903-907 are part of a server spitting initial sequence. The process blocks 910-917 are part of a server spitting node isolation sequence.

FIG. 6B is a flowchart showing the client spitting algorithm, beginning at a start block 931 for a client on an active network. From the start block 981, the process advances to a decision block 982, where a transmit status is examined. If the transmit status is "ready," then the process advances to a decision block 983; otherwise, the process advances to an idle block 988 (the idle block returns to the decision block 982).

In the decision block 983, if the node has received the system token, then the process advances to a transmit block 989; otherwise, the process advances to a decision block 984. In the transmit block 989, the node transmits a packet of data and the process returns to the decision block 982. In the decision block 984, if the node has received an LIPD request, then the process advances to a process block 990; otherwise, the process advances to a decision block 986. In the decision block 986, the process checks for a timeout or a system sleep state. If the process detects a timeout or sleep, then the process advances to a process block 987, wherein the present node asserts itself as the active server.

In the process block 990, the mask from the LIPD is compared with the node address of the present node, and the process advances to a decision block 991. In the decision block 991, if the mask matches the node, then the process advances to a respond block 992; otherwise, the process returns to the decision block 982. In the respond block 992, the node responds to the network server (with a LoGI or DACK as appropriate) and the process returns to the decision block 982.

Group LIP (LIPG) Query

While the network is awake, the active network server periodically broadcasts group LIP queries. A group LIP (LIPG) query requires a Logical Group Isolation (LOGI) response from any number of nodes. This mechanism gives client nodes an opportunity to be inserted into the lineup card during a busy network in a collision-free mechanism. The beauty of the LoGI packet, is that multiple simultaneous nodes can transmit this type of packet (assuming they are within the same time period) and the result will be a single LoGI packet. Thus, multiple LoGI responses result in a single LoGI packet seen by the receiving node.

The initial LIP sequence packet is an unmasked group LIP (LIPG) query which is sent to determine if anyone on the network wants to start the LIP sequence to insert into the lineup card. If a LoGI response is seen, chances are only a single node wants to insert, thus an unmasked direct LIP (LIPD) packet is sent next. If a direct response is not seen, subsequent LIPG packets are sent as group packets with a masked address. This is the laborious and less efficient isolation mechanism used to isolate a particular node for insertion into the lineup card. This is accomplished by systematically transmitting a bitmask, which isolates a single bit of the remote nodes 32-bit address at a time. This isolation mechanism must be performed if two or more conflicted nodes request the token at the same time.

Direct LIP (LIPD) Query

Direct LIP (LIPD) queries are sent as a result of a LoGI response from a LIPG query. The purpose of the LIPD query is to expedite the LIP process by transmitting an unmasked LIPD request to all nodes, hoping that only a single node will respond (which should be the case most of the time). The LIPD packet is responded to with an ordinary DACK response, which includes the address of the responding node. If a single node responds, the response is seen, and the node address is added to the lineup card appropriately. If, however, the LIPD request is not seen, (due to multiple nodes responding simultaneously) the active network server continues to isolate, via the normal isolation algorithm, using LIPG packets to select only one of the contending nodes for insertion into the "lineup card".

Thus the LIPD packet is only used to expedite the isolation process, hoping that only a single node responds to the request.

Node Isolation Sequence

If a node responds to the initial LIPG, but a single response is not seen from the LIPD query for any reason, the active network server automatically goes into node isolation. The isolation sequence uses LIPG packets, which require a LoGI response. This allows multiple simultaneous responses to be seen by the active network server.

The "active network server" initiates this sequence by transmitting a packet with the first address (least significant) bit set. Nodes desiring to transmit, respond to this packet if and only if this particular address bit matches their own. This algorithm is a simple "AND" followed by a comparison to the original mask. If the two values match, the packet is responded to with a LoGI.

The active network server then transmits the next packet with the previously matched mask untouched, with the next bit set. Again, nodes will respond if the entire bit sequences matches. If none of the nodes respond, the active network server clears the current bit and retries the packet. This goes on until all 32 bits have been identified and a match is found. At this point in time, the uniquely identified node is added to the active network server's lineup card.

Centralized Token-Passing (Polling)

When the system is awake, it is desirable to give each node included on the lineup card (via the spitting process) a deterministic time slot in which it can access the medium 100. It is further desirable to give each node the same opportunity to transmit on a busy medium 100. Ethernet lacks either of the aforementioned benefits, whereas Token-Ring possesses both.

Token-Ring has a disadvantage of requiring each node to know its upstream and downstream neighbor's address, and constant existence/rotation of a token. The overhead requirements of conventional token-ring networks are incompatible with the dumb nodes contemplated by PLX. Furthermore, the ad hoc networking requirements of a power-line network are not conducive to such strict token rotation. Thus PLX introduces the Centralized Token-Passing (CTP) mechanism with a dynamic lineup card.

In CTP, the active network server node is responsible for ensuring that a token exists, that every node needing the token gets it, that sleeping nodes can wake-up and receive the token, and that tokens are distributed fairly in a deterministic fashion. Under CTP, nodes other than the active server are referred to as clients. The active network server role is self-appointed through the aforementioned datagram detection or listening process. The role of the active network server is relinquished after a pre-determined time period of in-activity on the medium 100. In one embodiment, the active server role is relinquished after approximately five seconds of inactivity. During system activity, the active network server is responsible for polling each client node in the lineup card, as well as allow new nodes the opportunity to insert themselves into the lineup card through the spitting process.

Figure 7:
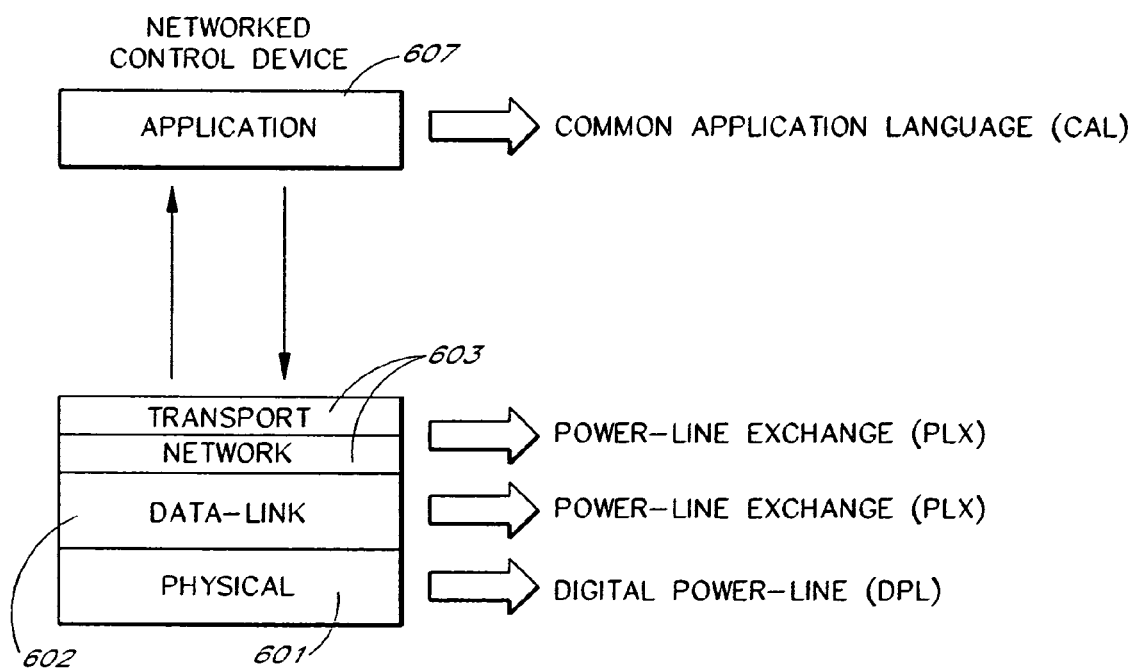
FIG. 7 is a block diagram of a PLX network model for a dumb device.

FIG. 7 is a flowchart showing the network server polling algorithm, beginning with a start block 1001 where a node becomes the active server. The process advances from the start block 1001 to a decision block 1002, where process determines the need to transmit a periodic LIP packet. If a LIP packet is needed, then the process advances to the process block 1010; otherwise, the process advances to a process block 1003. In the process block 1010, the node executes the active server spitting process described in connection with FIG. 6A. Upon completion of the process block 1010, the process advances to the process block 1003.

In the process block 1003, the process obtains the next entry in the lineup card and advances to a decision block 1004. In the process block 1004, if all of the entries in the lineup card have been processed (that is, if all client nodes have had an opportunity to speak) then the process advances to a process block 1011; otherwise, the process advances to a process block 1005. In the process block 1011, the token is given to the active server (thus allowing the active server to speak) and the process advances to the process block 1005.

In the process block 1005, the token is given to the next node obtained from the lineup card and the process advances to a decision block 1007. In the decision block 1007, if a response timeout occurs, then the process advances to process block 1012; otherwise, the process advances to a decision block 1007. In the decision block 1007, if the client node did not use the token, then the process advances to the process block 1012. In the process block 1012, a count of the number of active nodes is decremented and the process advances to a decision block 1008.

In the decision block 1008, if all nodes are inactive, then the process advances to a process block 1009; otherwise, the process returns to the decision block 1002. In the process block 1009, the active server reverts back to an inactive client node.

Packet Types and Formats

Packets on a PLX network can take on different formats depending on the purpose of the packet. The different formats are conveniently grouped into three separate categories.

One format allows multiple nodes to simultaneously transmit/receive the same response packet without interference or demodulation problems. These are called Logical Group Isolation (LoGI) packets and are used primarily for broadcasting/re-broadcasting and acknowledgments.

The other two types of packets, called raw data payload packets and command payload packets are used when a single node is communicating on the wire at any given point in time. A raw data payload packet is used by an application desiring to transmit/receive information pertaining to its application. Packets coming from a host node are raw data payload packets, as well as any CAL packets.

A PLX command payload packet is used to manage the media access and flow. PLX command packets originate and terminate within the firmware and hardware of the adapter, and are not passed on to the host node. PLX command packets facilitate the smooth flow of tokens, acknowledgements, lineup insertions, etc., and are inherent in all PLX networks.

Logical Group Isolation (LoGI) Response Packet

Figure 8:
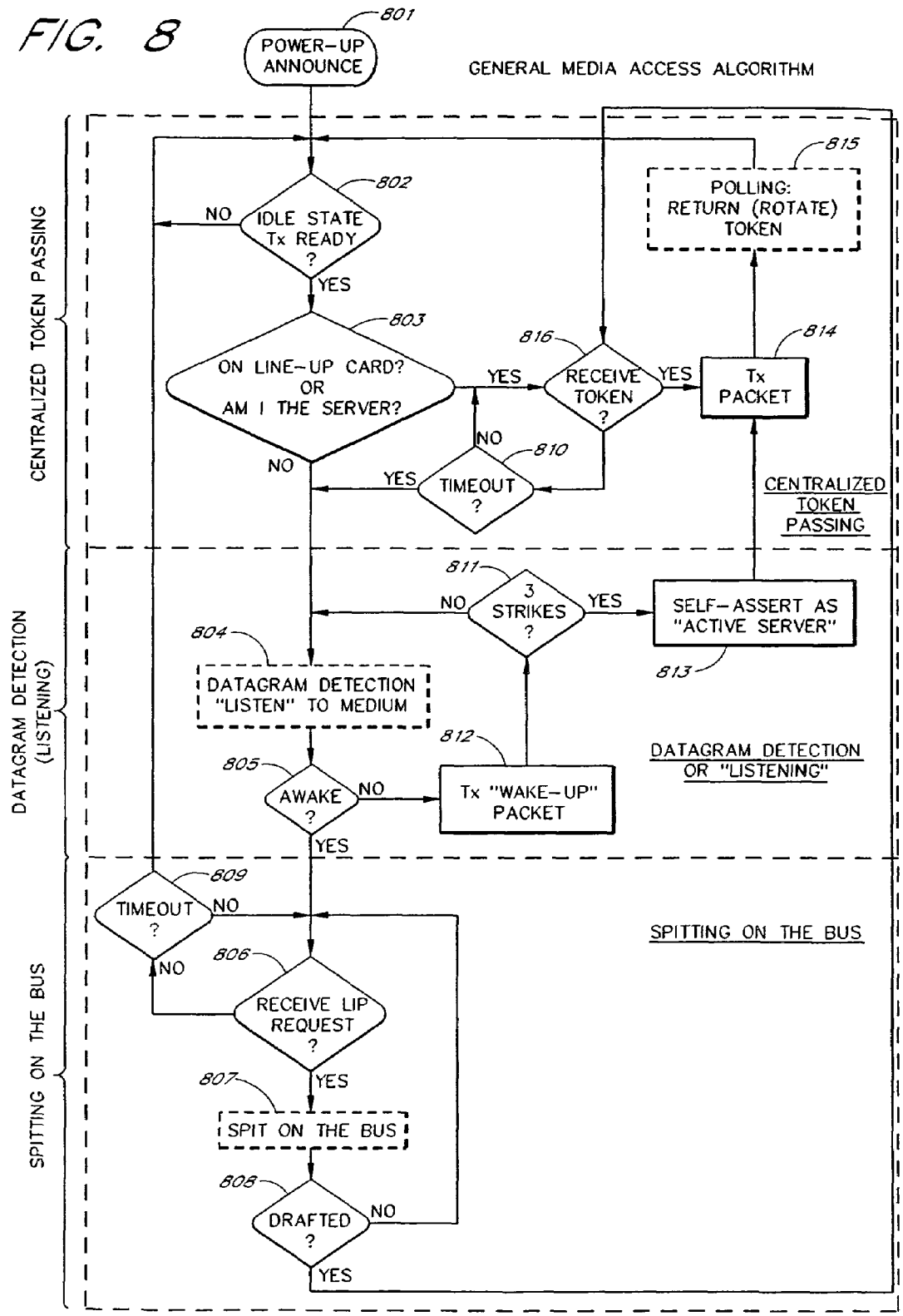
FIG. 8 is a flowchart showing the media access algorithm.

The first form is used when a node sends out a group request (a request with the probability of multiple simultaneous responses) onto the network. Since PLX is desirably a reduced collision, or in some cases a collision-free, environment, it is difficult to detect collisions. Therefore, simultaneous responses are possible. The LoGI packet 1100, shown in FIG. 8, includes a two-byte NULL field, followed by multiples of a two-byte All "1" fields, terminated by a two-byte NULL field. The data present in this type of packet is very cryptic, but it does serve its purpose to help isolate group responses down to a single node.

A LoGI packet is preceded by a masked LIPG request. The mask means more than one node could match the masked address, and thus multiple simultaneous responses could occur. The LIPG packet is described in later.

The LoGI packet can also contain some very simplistic data by lengthening the series of ones present within a particular packet. The lengthened packet must be used in conjunction with a time displacement to indicate a different type of response. Broadcast packet use this feature to allow a busy response to be indicated by one or more nodes in a simultaneous fashion.

Payload Packets

The second form is used to carry a payload around on the network. This is the form most commonly used on the network, and is the valid form for transmitting and receiving useful data information.

Payload packets additionally take on two forms which indicate the receiving audience scope and what type of a response they are expecting to receive. They are Group Addressed (typically broadcast packets) and Directly Addressed packet types. Group Addressed packets can only accept LoGI response packets, whereas Directly Addressed packets accept Direct ACKnowledge or DACK packets, since only a single response is expected.

Payload packet types are further sub-divided into two separate categories which determine the use of the payload within the packet. They are: Raw Data packets, and PLX Command packets.

Raw Data Packets

Figure 9A:
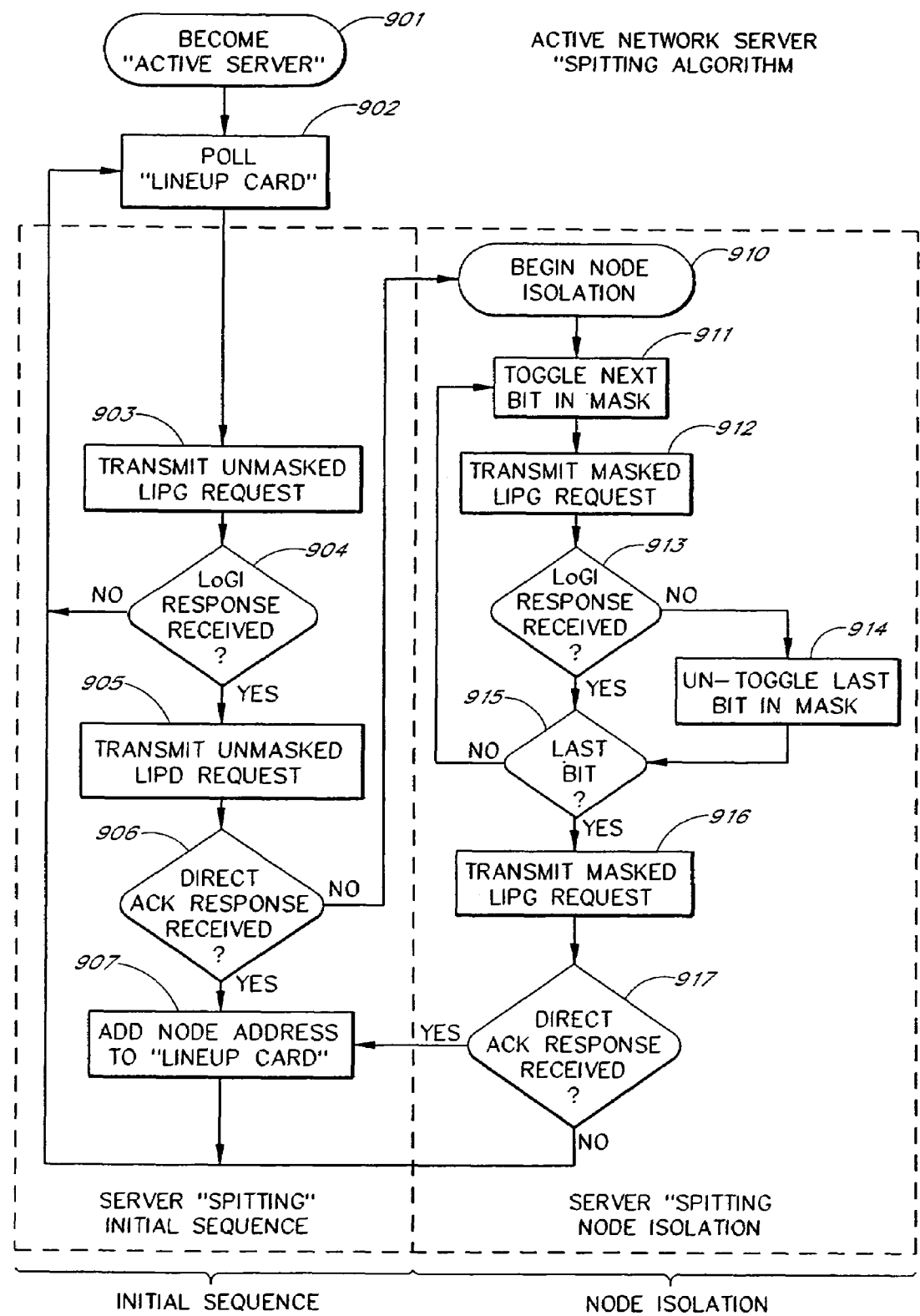
FIG. 9A is a flowchart showing the active network server spitting algorithm.
Figure 9B:
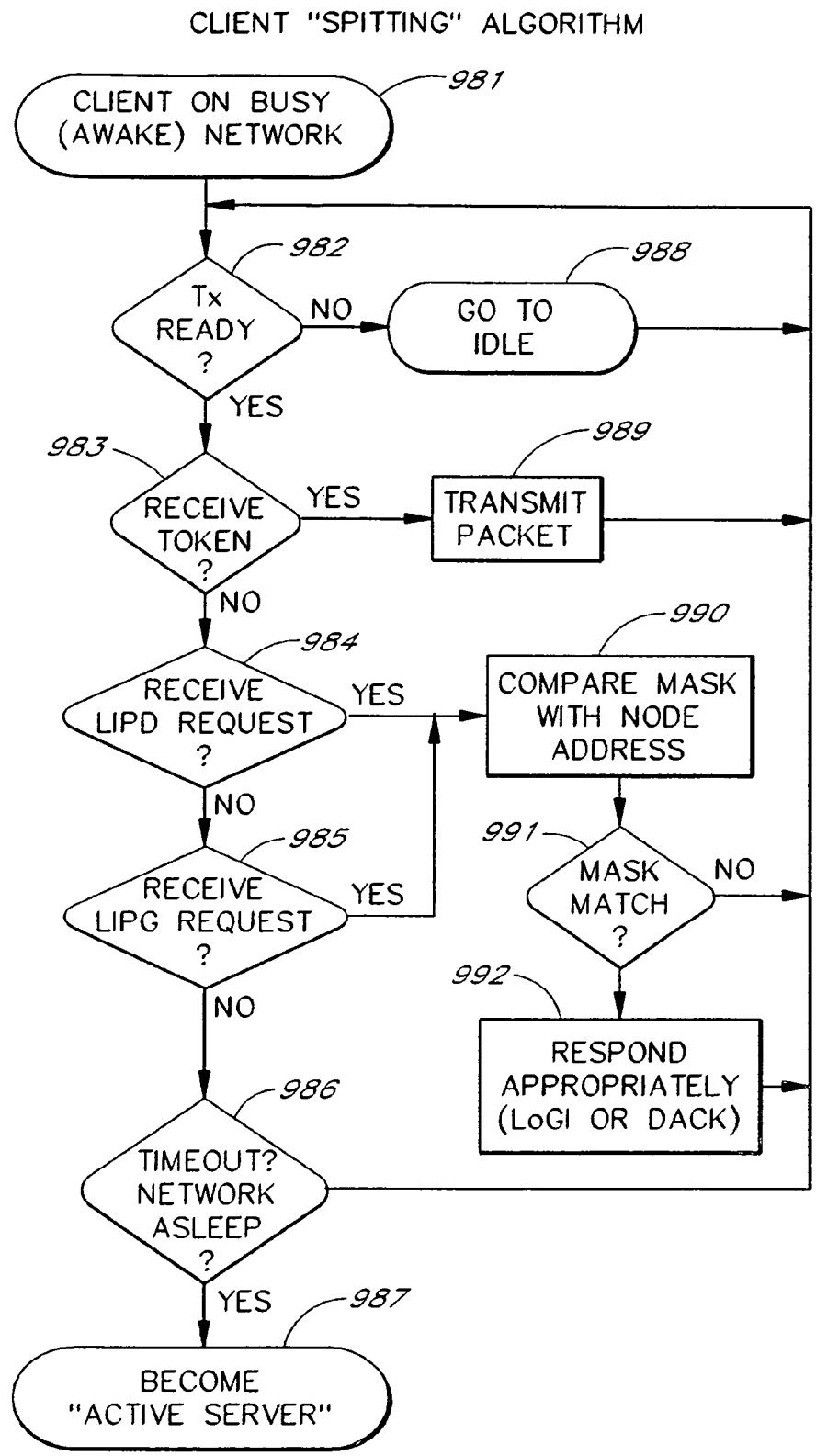
FIG. 9B is a flowchart showing the client spitting algorithm.

The format of a raw data packet 1200 is shown in FIG. 9 and includes a preamble field 1201, a length field 1202, a length field 1203, a ctrl field 1204, a destination address field 1205, a source address field 1206, a sequence field 1207, an authentication field 1208, a DSk field 1209, an SSk field 1210, a payload field 1211, and a CRC field 1212. The raw data packet 1200 is sent by an active server node or client node. The length field 1202, the length field 1203, the ctrl field 1204, the destination address field 1205, the source address field 1206, the sequence field 1207, then authentication field 1208, the DSk field 1209, and the SSk field 1210 are components of a MAC header 1215. The payload field 1211 includes application layer information to be parsed by an appropriate payload handler. The host PC and CAL interpreter are examples of payload handlers. In one embodiment, the raw data packet 1200 has a 3-byte preamble 1201, a 13-15 byte MAC header 1215, a payload section 1211 of up to 255 bytes and a 2-byte CRC 1212.

PLX (External) Command Packets

Figure 10:
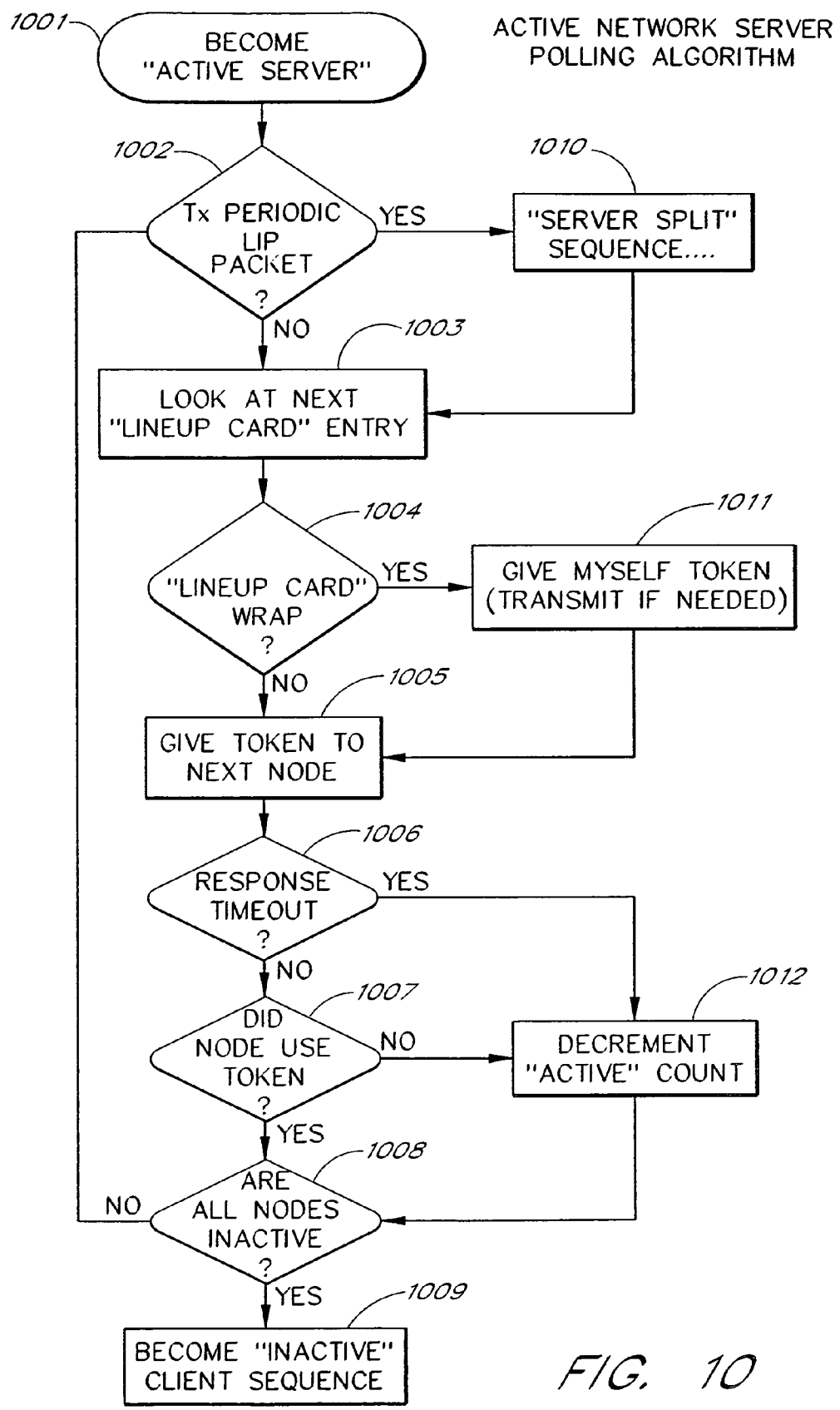
FIG. 10 is a flowchart showing the active network server polling algorithm.

PLX Command packets are used to facilitate the flow of data on and off of the medium 100 by providing a means for two nodes to communicate via brief packet sequences. A description of the variations of PLX Command packets are presented below:

Token Packets: The format of a PLX token packet 1300 is shown in FIG. 10 and includes the preamble field 1201, the length field 1202, the length field 1203, the ctrl field 1204, the destination address field 1205, the CRC field 1212. The length field 1202, the length field 1203, and the ctrl field 1204, have the (hexadecimal) values 0×05, 0×05, and 0×17 respectively.

The token packet 1300 is sent to a directly addressed node, and solicits either payload type packet. Nodes not requiring attention should simply DACK (with the status field set to 0×03), meaning they don't have anything to say and will not be using the token.

Client nodes should invoke a token (through the LIP process) before transmitting onto an active network. As long as a node continues to use the token, the active network server will continue to hand it a token. If, however, the client node repeatedly responds with a "token not used" response, the active network server will age the node and it will be taken out of the lineup.

A token packet contains the usual MAC header (minus a source address) and CRC, however, the data field is not used (the size of the data field is zero). Tokens can only come from the 'active network server' whose address is fixed to be 0×fffffffe, thus the source address field is not needed.

Figure 11:
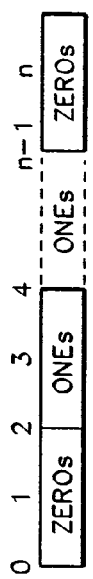
FIG. 11 is a block diagram showing the fields of a PLX Logical Group Isolation (LoGI) Packet.

Direct ACKnowledge (DACK) Packet: The format of a PLX token packet 1400 is shown in FIG. 11 and includes the preamble field 1201, the length field 1202, the length field 1203, the ctrl field 1204, the destination address field 1205, a status field 1401, the CRC field 1212. The length field 1202, the length field 1203, and the ctrl field 1204, have the (hexadecimal) values 0×06, 0×06, and 0×07 respectively.

A DACK packet is sent by a receiving node to acknowledge the valid reception of the packet or packet sequence. DACK packets are only returned from directly addressed message packets (with the exception of the LIPD packet).

A DACK packet is used to terminate a typical hand-shaking sequence between two nodes on the network and as a result involve three nodes . . . 1) Active network server, 2) Node requesting, and 3) Node responding. (Requesting/responding nodes can also be the "active network server" if it is the destination of the current request). The DACK status field varies depending on the node type receiving the packet (active network server or client). DACK packets sent back to the requesting node (by the responding node) relinquishes control back to the requesting node to continue a packet stream, DACK packets sent back to the "active network server" (by the requesting node) relinquish control back to the "active network server", signifying the end of a packet stream. Requesting nodes are responsible for re-requesting a packet if a response or DACK packet is not received.

The DACK packet contains a typical MAC header and CRC, and a 1-byte payload. The status field contains information regarding the received packet and is returned within this field. Values for the status field 1401 are listed in Table A2.

TABLE A2

Values for the DACK status field 1401.

| DACK | Node | Description |
| --- | --- | --- |
| 0x0 | All | Receive buffer full (Failure) |
| 0x1 | All | Failure (multi-channel responses) |
| 0x2 | Server | Token used by node |
| 0x3 | Server | Token NOT used by node |
| 0x4 | Server | Token responding to "wake-up" request |
| 0x9 | All | Printer sequence numbering error |
| 0xa | All | Printer unplugged error |
| 0xb | All | Printer off-line error |
| 0xc | All | Printer general error |
| 0xd | All | Printer out of paper error |
| 0xe | All | Printer unknown error |
| 0xf | All | Success |

It should be noted that this information is passed on the actual medium 100 itself, and may not be the status passed up to the host node. Please see the section on Internal PLX packets, Tx Status for more information regarding status information that is passed up to the host.

Figure 12:
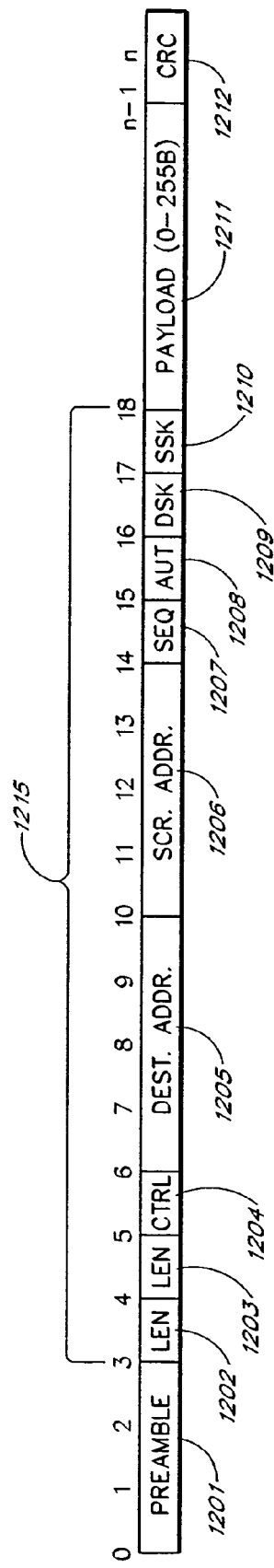
FIG. 12 is a block diagram showing the fields of a PLX raw data packet.

Lineup Insertion Packets (LIPD and LIPG): FIG. 12 shows the format of a PLX LIPG packet 1500, which includes the preamble field 1201, the length field 1202, the length field 1203, the ctrl field 1204, the destination address field 1205, a mask field 1501, and the CRC field 1212. The length field 1202, the length field 1203, and the ctrl field 1204, have the (hexadecimal) values 0x09, 0x09, and 0x23 respectively.

Figure 13:
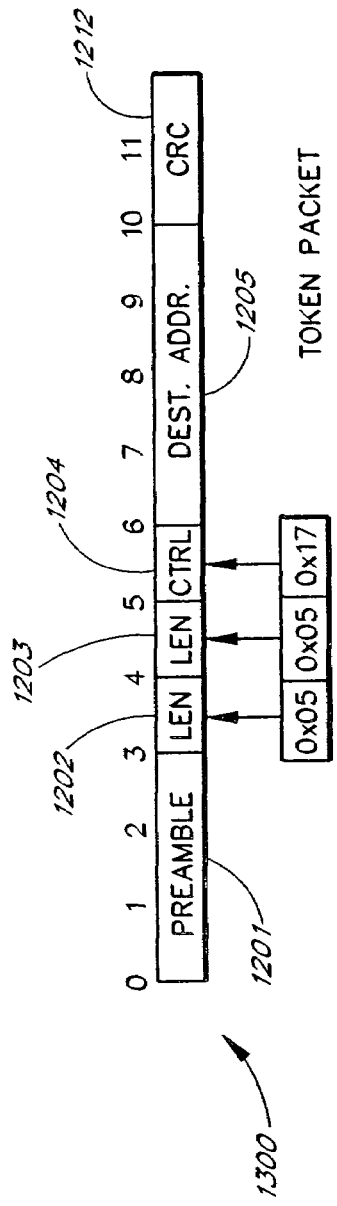
FIG. 13 is a block diagram showing the fields of a PLX token packet.

FIG. 13 shows the format of a PLX LIPD packet 1600, which includes the preamble field 1201, the length field 1202, the length field 1203, the ctrl field 1204, the destination address field 1205, a NULL field 1601, and the CRC field 1212. The length field 1202, the length field 1203, and the ctrl field 1204, have the (hexadecimal) values 0x09, 0x09, and 0x23 respectively.

Lineup Insertion Packets (LIP) are periodically sent by the "active network server" to allow new recruits to enter the existing lineup card. This is accomplished with two separate packets, which are both broadcast to all listening nodes. The first packet, the LIPG packet 1500, contains the LIP mask field 1501. The mask 1501 must match the address of the remote before responding with a LoGI response. The second packet, the LIPD packet 1600, is used to expedite the insertion process by having the responding node respond with a DACK packet which contains its source address (to be inserted into the lineup card).

Therefore, LIPG packets are masked and have a corresponding bit sequence in the LIP mask field. A node should respond to the LIPG packet with a LoGI packet. Likewise, LIPD packets are unmasked, which means any node desiring to enter the lineup card (which implies the node is not already on the lineup card) should respond with a DACK.

Payload Packet Frame Format

Following is a description of each of the fields that could be present within a payload type packet. This is true for both the raw data and PLX command packet types.

Although the preamble/start sequence is not part of the packet format, it is a pre-determined bit pattern used for detecting carrier, synchronizing the hardware to the incoming packet, and for determining the bit times or line speed of the subsequent bytes within the current packet. The length of the preamble is dictated by the minimum amount of bit times required to establish the presence of a valid carrier and synchronization on the line. The bit pattern of the preamble 1201 is:

| Value | Sequence |
|---|---|
| 0xaa | 1$^{st}$ sync byte |
| 0x31 | 2$^{nd}$ sync byte |
| 0xnn | Speed/3$^{rd}$ sync byte |

The speed (or 3$^{rd}$ sync) byte determines the speed of the in-coming data (starting with the length byte 1202) and is summarized as follows:

| Value | Speed |
|---|---|
| 0x55 | Low speed - 650 k |
| 0xdd | Mid speed - 1000 k |
| 0x99 | Hi speed - 1.19 m |
| 0x11 | reserved |

Finally, the preamble is followed by two duplicate length bytes 1202-1203, which describe the length of the packet. These bytes will come in at the new speed.

Length Fields

The length fields 1202-1203 are used to indicate the size of the in-coming packet. The length fields 1202-1203 are used by the hardware (in the absence of a carrier detect signal) to determine valid packet reception. Once the length of the packet is reached, the CRC field 1212 is tested for validity. The length of a PLX packet is thus preferably limited to 256 total bytes (excluding the preamble field 1201 and the CRC field 1212). The length includes the MAC header 1215 (Control, Address, etc.), optional fields and the payload field 1211.

The length field is duplicated two times (1202, 1203) to ensure validity of the incoming data stream (it acts as an extension of the preamble). The length fields 1202-1203 must match each other (as well as a preamble match) before packet reception begins.

Control Field

As shown above, payload packets can be one of the following two main types: PLX command packets or raw data packets.

PLX command packet types can be further classified into two sub-types: External and Internal PLX commands. Internal PLX command packets refer to the handshake between the hardware and the host node driver through the local connection (USB, 1584, serial, etc.). External PLX command packets refer to handshake packets on the power line medium 100 itself which regulate medium 100 access.

The control field 1204 varies depending on the type of packet as shown with each bit dedicated for a particular definition as shown in table A3.

TABLE A3

Bits in the control field 1204.

| BIT | PLX (EXT) | PLX (INT) | RAW (NON-PLX) |
|---|---|---|---|
| 0: | PACKET_TYPE(1) | PACKET_TYPE(1) | PACKET_TYPE (0) |
| 1: | PLX_SUBTYPE(1) | PLX_SUBTYPE(0) | RAW_ACK_TYPE0 |
| 2: | PLX_ACK_TYPE | reserved(0) | RAW_ACK_TYPE1 |
| 3: | reserved(0) | reserved(0) | CIPHER |
| 4: | EXT_SUBTYPE | INT_SUBTYPE | SOCKET |
| 5: | EXT_SUBTYPE | INT_SUBTYPE | reserved (0) |
| 6: | EXT_SUBTYPE | INT_SUBTYPE | PID |
| 7: | EXT_SUBTYPE | INT_SUBTYPE | reserved (0) |

Packet Type

The Packet Type bit is used to designate whether the given packet is of type PLX or of type raw data or non-PLX. Since PLX protocol requests are handled differently, and in most cases by the microcontroller firmware, and raw data packets are typically handled by a separate application or host software, it was expedient to make a differentiation in the control field. Raw data packets typically contain raw payload information to be handed to the appropriate application software. An exception to this case is the CAL packets which contain part of the interpreter in the microcontroller and part in the host machine.

| Bit 0 | Packet Type |
|---|---|
| 1 | PLX command packet = 1 |
| 0 | Raw data packet = 0 |

PLX Sub-Packet Type

PLX commands typically come in one of two forms. The first form is a request from the wire by another node, the second form is a request from the host, which does not go onto the wire. Since the microcontroller firmware makes a distinction between responding to these two types, and since the two types are completely separate from each other, this bit was created.

| Bit 1 | PLX Sub-Packet Type |
|---|---|
| 1 | External PLX command packet = 1 |
| 0 | Internal PLX command packet = 0 |

PLX ACK Type

The Token and DACK command packets are used to transfer access rights to the medium 100, and terminate a sequence where the "active network server" temporarily releases control of the medium 100 to another node. The other two PLX command packets, LIPG and LIPD, require a response packet. The response type is either of type LoGI or of type DACK. This bit determines what type of response the node should utilize.

| Bit 2 | PLX ACK Type |
|---|---|
| 1 | Respond with a DACK = 1 |
| 0 | Respond with a LoGI = 0 |

PLX Sub-Packet External Types

The PLX Specification provides connectionless, acknowledged and unacknowledged data transfer services between two nodes within a centralized (server arbitrated token) token-passing system. These bits allow for this communication to take place.

The active network server places a directed token onto the medium 100 before a client can begin transmission. A client node terminates access rights to the medium 100 with a DACK response packet directed back to the active network server node. The active network server maintains a lineup card of active nodes when polling client nodes. To get onto the lineup card, a client node responds appropriately to either a directed LIP request (LIPD) or a group LIP request (LIPG).

Once on the lineup card, nodes will be polled, and they can send and receive packets with payload information, in either an acknowledged or unacknowledged format. The following is a table A of valid PLX sub-packet external types allowed on the medium 100:

| Bits(7, 6, 5, 4) | | | | Byte Value | PacketSub-Type |
|---|---|---|---|---|---|
| 0 | 0 | 0 | 0 | 0x07 | DACK |
| 0 | 0 | 0 | 1 | 0x17 | Token |
| 0 | 0 | 1 | 0 | 0x27 | LIPD |
| | | | | 0x23 | LIPG |
| others... | | | | | Reserved |

NOTE: If a DACK/GACK is not received by the requesting node within the pre-determined inter-gap spacing requirements, then the transmitting (requesting or responding) node is responsible for re-trying the request (response).

PLX Sub-Packet Internal Type

The PLX Specification allows portions of the protocol to exist on a host node, such as a PC. Periodically, the host node will need to access information on the attached node to which it is physically connected. This is known as an internal PLX request, since it is meant for the attached node, and should typically not be placed on the wire to be sent to a remote node. Below is a description of the possible internal PLX sub-types:

| Bits (7, 6, 5, 4) | | | | Byte Value | Packet Sub-Type |
|---|---|---|---|---|---|
| 1 | 1 | 1 | 1 | 0xf1 | ERROR Handshake |
| 0 | 0 | 0 | 1 | 0x11 | CAL Request |
| 0 | 0 | 1 | 0 | 0x21 | CAL Response |
| 0 | 0 | 1 | 1 | 0x31 | Tx Status |
| 1 | 1 | x | x | | Reserved |

Internal sub-types are sent from the host and consumed by the hardware, and an appropriate response is sent back to the host node. Internal packets are never sent onto the medium 100. As such, this packet type is no defined under the payload packet section, but is in the section defined under PLX (Internal) Host packets.

Raw ACK Type

The Raw ACK Type specifies what type of response should follow the current raw data packet. Response types take on one of four forms: Burst (no response), Double LoGI, LoGI, and a DACK.

A burst type is self-explanatory, packets are sent one after the other. The last packet of a burst sequence should have a different ACKnowledge type assigned (to complete the burst sequence, a response is used).

A Double LoGI sequence allows group or broadcast requests to be sent. If a node CANNOT buffer the packet, it responds within the first inter-gap space, if it correctly received and parsed the packet, it responds during a delayed inter-gap space.

LoGI responses are directed toward a single node and are the most efficient mechanism for responding. The length of a LoGI packet is the most bandwidth efficient, but is unable to contain much information about the response.

DACK responses are directed toward a specific node, but can contain much more information within the response than the LoGI type.

| Bits (2, 1) | Packet Sub-Type |
|---|---|
| 0 0 | Burst |
| 0 1 | Double LoGI |
| 1 0 | LoGI |
| 1 1 | DACK |

Cipher

The cipher bit allows the packet contents, starting with the authentication byte, to be encrypted. One encryption scheme uses a 256-bit Diffie-Helman handshake to do a key-exchange, after which, a secret 32-byte array is securely sent across the medium 100. Subsequent transaction can use the encryption array for secure communication.

Bit 3: Cipher

Current Packet IS Encrypted=1

Current Packet IS NOT Encrypted=0

Socket

Typically a PLX raw data payload packet will be comprised of the following field sizes:

| Field | Length |
| --- | --- |
| Preamble 1201 | 3 Bytes |
| Length 1202, 903 | 2 Bytes Duplicated |
| Control 1204 | 1 Byte |
| Destination Address 1205 | 4 Bytes |
| Source Address 1206 | 4 Bytes |
| Payload 1211 | 0-255 Bytes |
| CRC 1212 | 2 Bytes |

When multiple applications exist on the same node, a mechanism is used whereby is packets can be routed to the appropriate application within a specific node address. These types of applications use a socket field. The first byte is the destination socket address, and the second byte is the source socket address. Therefore, by setting this bit, the MAC header size increases by 2. This field will immediately follow the authentication byte field when implemented, and is included if the following bit is set:

| Bit 4 | Socket |
| --- | --- |
| 1 | Include Socket Field |
| 0 | Don't Include Socket Field |

Protocol ID (PID)

Each packet contains information which can be parsed by higher-level protocols such as IPX, TCP/IP, or CAL. PLX is simply used as a transport to encapsulate these types of packets to be sent/received across the network. Typically, the higher-level parsing routines exist on a host system; however, the hardware is required to contain a minimum set of CAL parsing functions. As such, the hardware parses for CAL requests, and hands all other requests up to the appropriate payload handling routine. Some protocol information can be located in hardware (e.g., in ROM, FLASH memory, etc.), other protocol information is parsed by the host node. This bit determines whether the hardware protocol handler is required to initiate the parsing on this packet or not.

| Bit 6 | Protocol ID (PID) |
| --- | --- |
| 1 | Protocol ID Present (Micro Parse) |
| 0 | Protocol ID Absent (RAW - Host Parse) |

A RAW packet means the first byte of data is not a bytecode for the type of protocol, but instead is the first byte of the protocol header itself. PID Parse-able packets decode the first byte-code to determine which protocol should parse the packet.

Below are the options available when the PID bit is set. The first data byte will represent the type of protocol required to parse the current packet:

| Byte Value | Definition | Type |
| --- | --- | --- |
| 0xff | Reserved | n/a |
| 0xfe | COMPLETED Packet | cebusResp |
| 0xfd | FALSE Packet | cebusResp |
| 0xfc | ERROR Packet | cebusResp |
| 0xdf-0xfb | Reserved | n/a |

-continued

| Byte Value | Definition | Type |
| --- | --- | --- |
| 0xa0-0xde | Context Numbers (CAL) | cebusCmd |
| 0x9f | Reserved (CAL) | cebusCmd |
| 0x00-0x9e | Context Class (CAL) | cebusCmd |

Destination Address Field

The destination address 1205 contains the destination node for the current packet.

When a node has a request or is responding to another nodes request, it places the address of the node to which the response packet is destined, within the destination address field 1205. If the node is only capable of communicating to the active network server or the database server, it would put that address in the destination address field 1205. Otherwise, the destination address is typically taken from the source address field 1206 of the requesting packet.

Certain PLX addresses are well known. A list of these well known PLX addresses are shown below:

| Address | Description |
| --- | --- |
| 0x00000000-0xffffffef | Valid Unique Node Addresses |
| 0xfffffff0-0xfffffffc | Reserved |
| 0xfffffffd | Application Server Node Address |
| 0xfffffffe | Active network server Node Address |
| 0xffffffff | Broadcast Node Address |

Source Address Field

The source address 1206 contains the address of the node for the current packet. When a node has a request or is responding to another nodes request, it puts its own node address into the source address field 1206. The node address utilizes a portion of the 8 byte GUID, combined with the type of the node, to create a four byte node address. The least significant 7 nibbles from the GUID are used, and the node type overwrites the most significant nibble ($8^{th}$ nibble) of the node address.

EXAMPLE

If...
    GUID = 0x0123456789ABCDEF
    And Node Type = 0x03
Then...
    Source Address = 0x39ABCDEF
End If Sequence Number Field The sequence field 1207 provides a host application with the ability to recreate or reassemble a data packet or sequence which has been broken up into smaller packets for transmission on the medium 100. Duplicate sequence numbers can be thrown away, and unreceived sequence numbers can be re-sent. Sequencing provides for data integrity for larger data streams. The value placed in the sequence field 1207 field depends on the application, and can be used for alternate purposes if required.

Authentication Field

The authentication field 1208 allows each packet to be validated before completing reception. The authentication field 1208 is typically seeded by exclusive-oring the first two bytes of the encryption array. Thus all nodes within a secure system will be seeded with the same authentication value, and those all should pass this verification procedure. The authenticated field is further encrypted for increased integrity.

Payload Field

The data payload field 1211 is used to present information to the receiving node. The first byte of the payload data can contain a byte-code, which determines how to parse the contents. This first byte of data is used in conjunction with the RAW bit described earlier.

Cyclic Redundancy Check (CRC) Field

The Cyclic Redundancy Check (CRC) field 1212 is used to provide a reliable error detection technique within the transmitted packet. It is re-evaluated upon completion and compared for authenticity. Packets that do not pass this check are discarded.

The CRC algorithm is chosen to be efficient and simple enough, so as to provide a desired level of reliability, without undue overhead (in software and hardware). It is desirable to provide a CRC algorithm that is fast enough to be able to do on-the-fly CRC computations for both transmitted and received packets.

On-the-fly calculations (as a bit or byte is received, the CRC is updated, instead of waiting for the entire packet to come in, the same applies to transmits) are not mandatory, but help in the overall throughput and performance of the system.

In one embodiment, G(X) is given by $G(x)=x^{16}+x^{15}+x^{11}+x^8+x^6+x^5+x^4+x^3+x+1$.

PLX (Internal) Host Packets

Figure 14:
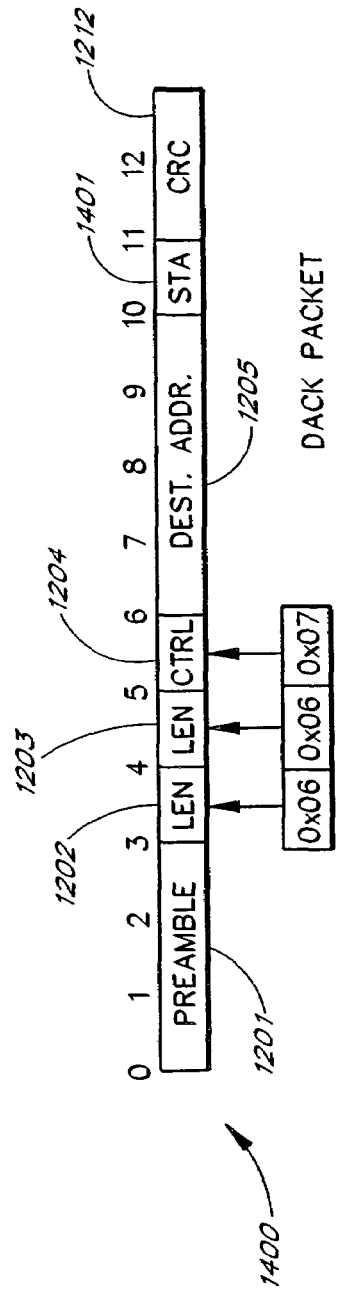
FIG. 14 is a block diagram showing the fields of a PLX Direct Acknowledgement (DACK) packet.

PLX Internal Host packets never reach the medium 100, as such, the packet description looks much simpler. The preamble 1201 is not needed, nor the duplicate length fields 1202,903, the addressing fields 1205,906 are not needed, and the CRC field 1212 is not needed. FIG. 14 shows the format of a PLX internal host packet, including a length field 1701, a control field 1702, and a data field 1703. The data field 1703 contains whatever the control field designates. As shown in the previous control field definition (which applies to PLX Internal Host packets as well), there exists a number of packets which pass between the hardware and host node which facilitate the flow of traffic. Following is a definition of each type packet.

CAL Request Packet

Figure 15:
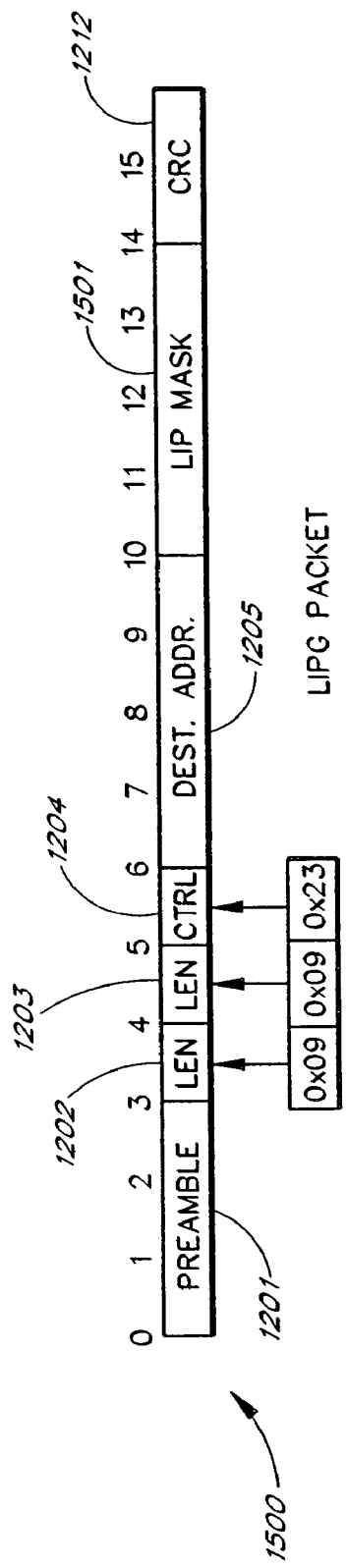
FIG. 15 is a block diagram showing the fields of a PLX masked Lineup Insertion Packet (LIPG).

FIG. 15 shows the format of a CAL request packet 1800, including the length field 1701, the control field 1702, and a CAL data field 1803. The control field 1702 has the value 0×11.

A CAL request packet 1800 is sent by the host to the hardware node to retrieve CAL information present on the hardware. Since PLX nodes can have application code or a host processor separate from the hardware/ASIC, CAL information can also be spread across these two separate processors. As such, the host processor periodically gathers CAL information from the attached node.

CAL Response Packet

Figure 16:
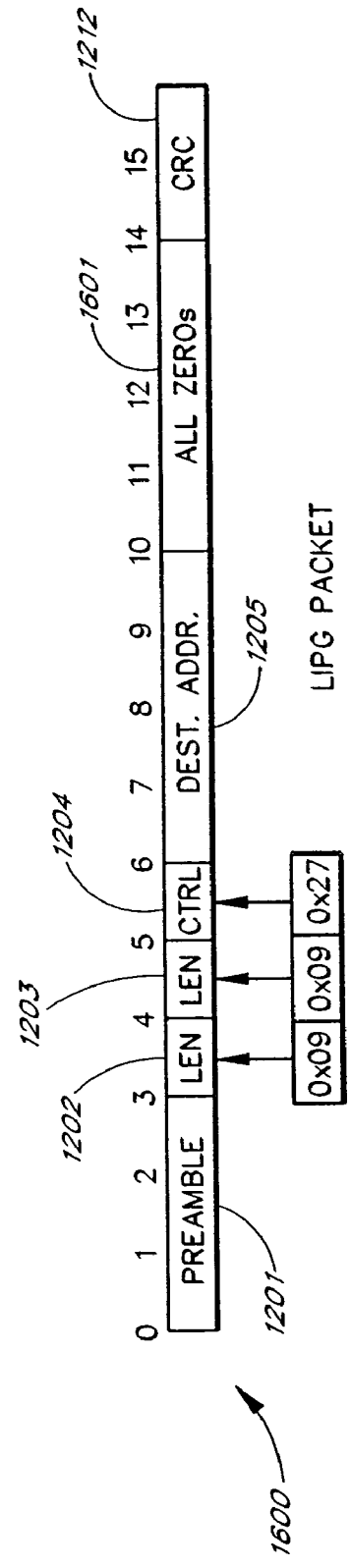
FIG. 16 is a block diagram showing the fields of a PLX direct Lineup Insertion (LIPD) packet.

FIG. 16 shows the format of a CAL response packet 1900, including the length field 1701, the control field 1702, and a CAL response field 1903. The control field 1702 has the value 0×21.

For the same reasons stated above, a CAL Response packet is sent from the hardware node to the attached host node. This response packet 1900 is sent in response to a preceding CAL request packet 1800.

Tx Status Packet (Single Channel, Speed)

Figure 17:
FIG. 17 is a block diagram showing the fields of a PLX internal host packet.
Figure 18:
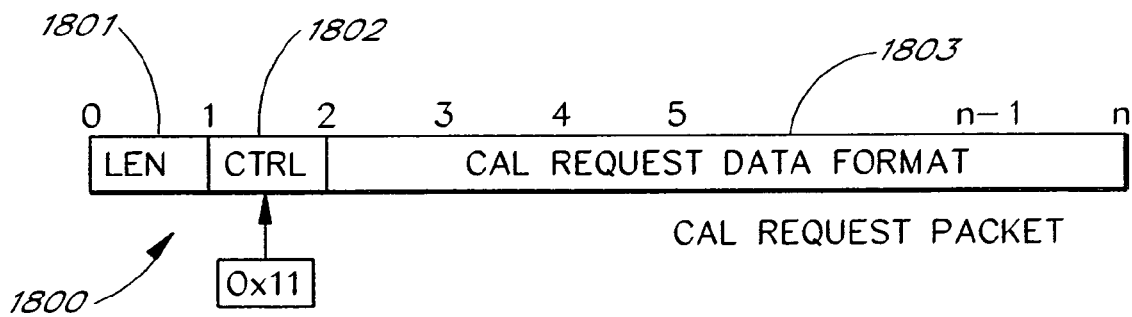
FIG. 18 is a block diagram showing a PLX Common Application Language (CAL) request packet.

FIG. 17 shows the format of a single channel CAL response packet 2000, including the length field 1701, the control field 1702, and a data field 1903. The control field 1702 has the value 0×21. FIG. 18 shows the format of a multi-channel CAL response packet 2100, including the length field 1701, the control field 1702, and a data field 2103. The control field 1702 has the value 0×31.

There are two forms of Tx Status packets. One form is for single channel, single speed applications and uses a control byte value of 0×21. The second form is for multi-channel, multi-speed solutions and uses a control byte of 0×31.

The single channel, single speed solution only has two Tx Buffers available, and the status of these two Tx Buffers is periodically given back to the host node via an internal PLX handshake. The purpose of these Tx Status packets it to close the loop regarding outstanding transmit events handed to the hardware from the host node. Oftentimes, the same value returned within a DACK packet will be handed to the host for information regarding this transmit event, however, many times the DACK is to an external PLX event, in which case the DACK value should not be handed to the host node. The DACK value is handed back to the host node when the host node originated the transmit request.

Accordingly, PLX uses duplicated the DACK status values shown below.

| DACK Status Field Values seen on the medium | |
|---|---|
| 0x0 = | Receive buffer full (Failure) |
| 0x2 = | Token used by node (Not passed to host) |
| 0x3 = | Token NOT used by node (Not passed to host) |
| 0x4 = | Token responding to "wake-up" request (Not passed to host) |
| 0x9 = | Printer sequence numbering error |
| 0xa = | Printer unplugged error |
| 0xb = | Printer off-line error |
| 0xc = | Printer general error |
| 0xd = | Printer out of paper error |
| 0xe = | Printer unknown error |
| 0xf = | Success |

Values 0×9 through 0×e are DACK responses from a printer node. Printer response values are handed back to the host node unmodified.

Value 0×f is a successful DACK response and if the host originated the request, this value is also handed back to the host node unmodified.

Values 0×2 through 0×4 are DACK response values to external PLX command packets and should not be handed up to the host node.

The only strange status value is 0×0, which on the wire means the receiving node is busy and therefore cannot accept the packet. The hardware recognizes this situation and will retry this packet (more often than if it weren't busy) for a specified number of times. If the receiving node remains in a busy state for an unusually long amount of time, the packet is finally aborted and a "failure—0×f" response status is handed back to the host node. A value of 0×0 handed back to the host node means nothing. It is the default value of a transmit event that has not been completed and the host will wait until a non-zero status is placed in this field. A value of 0×1 is never returned on the wire. If a node receives a packet with erroneous data, it simple does not respond to the packet, and the transmitting node is required to re-transmit it. A value of 0×1 is only handed back to the host when a transmit packet has timed out and hit its maximum number of retries.

Below is a table A showing the Tx Status values that are normally returned to the host node (Notice the values are not identical to the DACK response values in all cases):

| Tx Status Data Field Values | |
|---|---|
| 0x0 = | No Tx Status for this Tx Buffer |
| 0x1 = | Failure (Tx Timeout or Receive buffer full) |
| 0x9 = | Printer sequence numbering error |
| 0xa = | Printer unplugged error |
| 0xb = | Printer off-line error |
| 0xc = | Printer general error |
| 0xd = | Printer out of paper error |
| 0xe = | Printer unknown error |
| 0xf = | Success |

This means the following DACK information is not handed up to the host node via an internal Tx Status packet.

| Additional Tx Status Info NOT Given To Host | |
|---|---|
| 0x0 = | Receive buffer full (Failure) |
| 0x2 = | Token used by node (Not passed to host) |
| 0x3 = | Token NOT used by node (Not passed to host) |
| 0x4 = | Token responding to wake-up request (Not passed to host) |

The Tx Status byte is further broken up into two sections, each a nibble wide, to represent the two Tx Buffer status. The values in the Tx Status field with their respective meanings are shown below.

| Tx Status Value Examples | |
|---|---|
| 0x0f = | First Tx Buffer successfully sent |
| 0xf0 = | Second Tx Buffer successfully sent |
| 0xff = | Both Tx Buffers successfully sent |
| 0x1f = | Second Tx Buffer failed, First Tx Buffer successful |
| etc . . . | |

Tx Status Packet (Multi-Channel, Speed)

The second form of Tx Status packet is for multi-channel, multi-speed solutions. The entire previous discussion regarding the Single Channel Tx Status packet and how it relates to DACK values, still apply. The difference being, the amount of data information enclosed within the multi-channel/speed Tx Status packet. The packet will basically contain a single previously defined status byte for each channel present. The result is multiple bytes of data, with each byte representing a single channel with two separate Tx Buffers.

Packet Timing, Spacing and Retrying

All packets presented for transmission on the medium 100 must adhere to strict timing requirements. These timing requirements are the rules that allow the system to operate smoothly and without collisions. Adherence to these rules must be strictly enforced for proper operation.

Under normal operation, an "active network server" is present on the system and arbitrates with all active nodes for access to the medium 100. The following assumptions apply to such an active state present on the medium 100. Inactivity on the medium 100 implies each node is in a sleep state and must go through the normal "listening" process before asserting as "active network server".

Furthermore, the PLX system is characterized by acknowledged handshake sequences. Acknowledge packets are to be returned within specified time intervals. Token packets are required before transmitting anything other than an acknowledge (DACK, LoGI, or Double LoGI) packet. The active network server is the only node that has the right to transmit Token or LIP packets. Client nodes only transmit payload and acknowledge packets.

Typical Packet Timing

Figure 19:
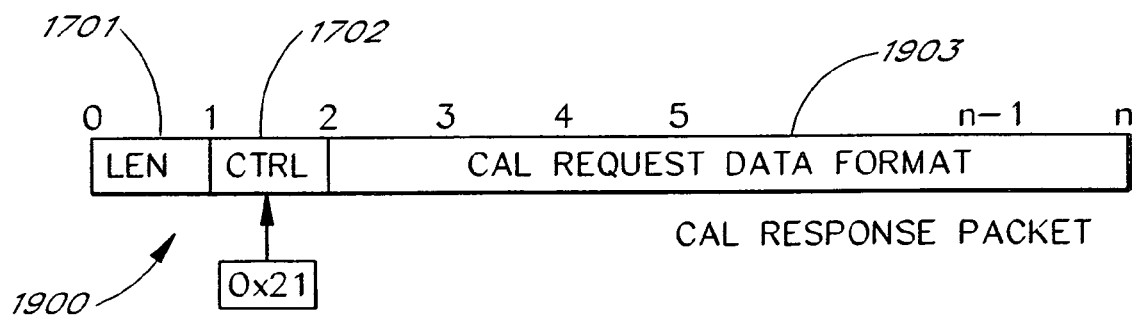
FIG. 19 is a block diagram showing a PLX CAL response packet.
Figure 20:
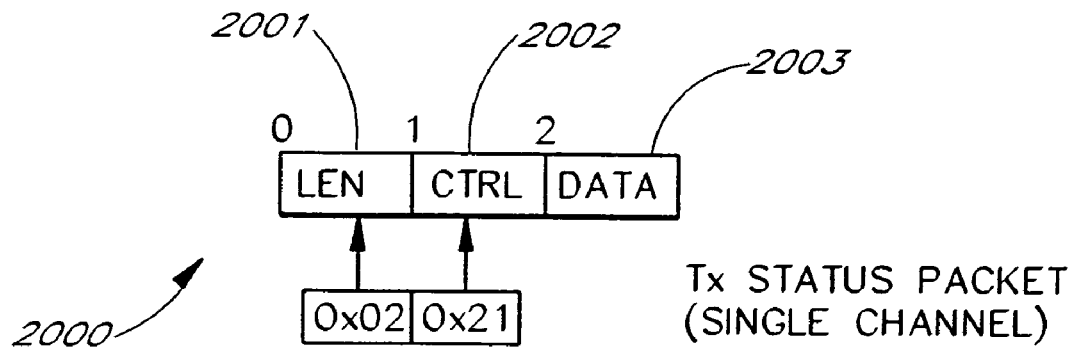
FIG. 20 is a block diagram showing a PLX single channel transmit status packet.
Figure 21:
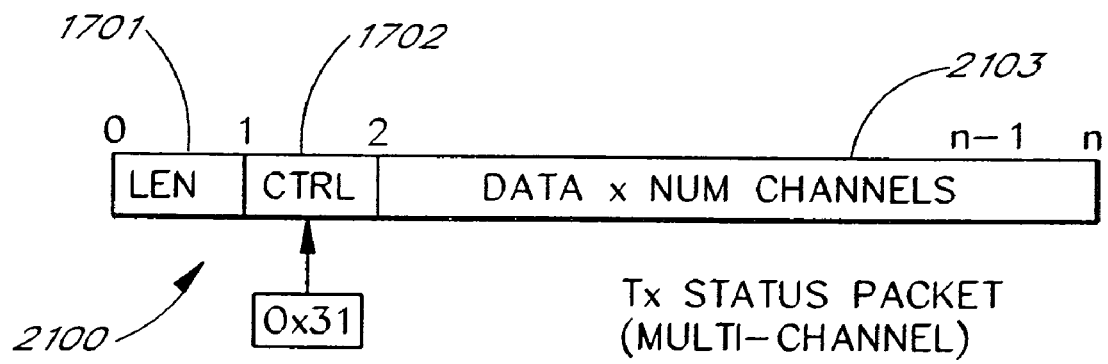
FIG. 21 is a block diagram showing a PLX multi-channel transmit status packet
Figure 22:
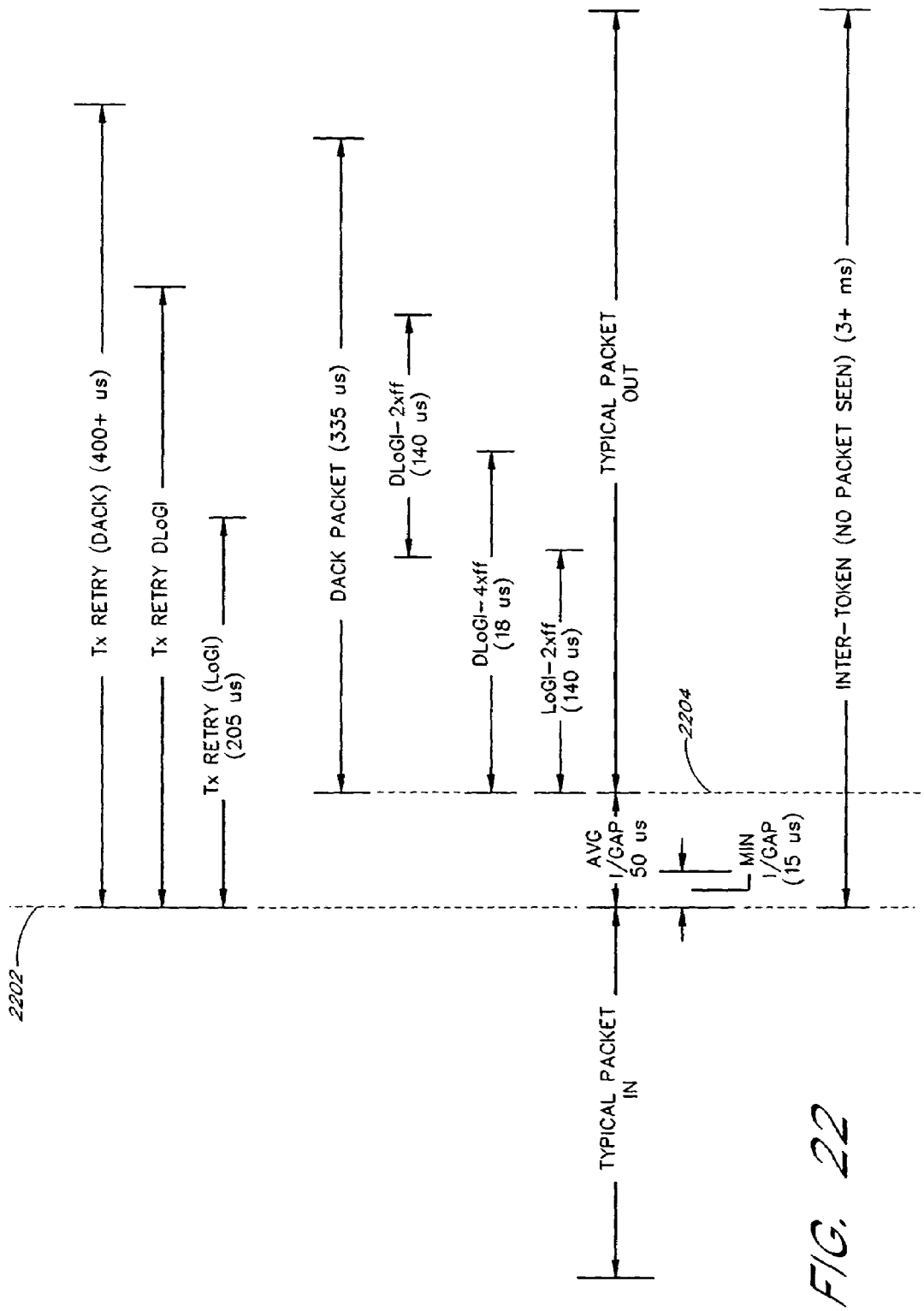
FIG. 22 is a timing diagram showing a PLX packet timing.

FIG. 19 is a timing diagram showing packet timing and spacing. Packet times are defined in relation to a first reference time 2202 and a second reference time 2204. The second reference time follows the first reference 2202 time by an Average inter-packet gap (I/Gap) of 50 us (microseconds).

The diagram shown above assumes timing for a system running at 650 kbps. All values other than the inter-gap timing should be adjusted as given in Table A4 wherein a superscript 1 denotes a time referred to the first reference 2202 and a superscript 2 denotes a time referred to the second reference 2204.

TABLE A4

| Packet timing. | | | | |
|---|---|---|---|---|
| | 350 kbps | 700 kbps | 1.2 mbps | 1.4 mbps |
| Min I/Gap[1] | 15 us | 15 us | 15 us | 15 us |
| Avg I/Gap[1] | 50 us | 50 us | 50 us | 50 us |
| Preamble | 130 us | 65 us | 38 us | 33 us |
| loGI Packet[2] | 140 us | 70 us | 40 us | 35 us |
| DLoGI Packet[2] | 185 us | 92 us | 54 us | 46 us |
| DACK Packet[2] | 335 us | 168 us | 98 us | 84 us |
| TxRetry LoGI[1] | 205 us | 103 us | 61 us | 52 us |
| TxRetry DACK[1] | 400 us | 200 us | 117 us | 100 us |
| TxRetry DloGI[1] | 320 us | 160 us | 94 us | 80 us |
| Inter-Token[1] | 3+ ms | 3+ ms | 3+ ms | 3+ ms |

Under normal conditions, typical packet timing requires the node receiving the packet to respond within a pre-determined amount of time. This response time is consistent with all packets except for the LoGI/Double LoGI acknowledge packet. Thus the two cases for packet timing are 1) LoGI/Double LoGI response and 2) All other responses.

Other Packet Timing

Nodes transmit a packet back to the node from which the payload packet originated, within a certain amount of time, with the exception of burst packets and acknowledge packets, which don't require a response packet. Response packets can be of the types: DACK packet, LoGI packet, or Payload packet.

Response packets adhere to the inter-gap spacing requirements shown above in FIG. 19. Minimum response time is typically greater than 15 microseconds, maximum response time typically should not exceed 50 microseconds.

If a transmitting node fails to receive an acknowledgement of the previous transmit, it must begin a retry process in order to increase reliability of delivery. This retry process typically begins after the longest possible acknowledge sequence or the length of a DACK packet plus the longest possible inter-gap spacing, or approximately 700 microseconds at 650 kbps.

Node Specific Information

Each node comes configured with a certain amount of information, which characterizes that specific node. PLX nodes require this minimal amount of information in order to fully function on the system.

Unique Identification, Addressability, and Globally Unique Identification (GUID)

When a PLX node is plugged into an electrical system, it is immediately ready for action. Each node comes with a burned-in serial number, of which the least significant 28 bits are used as a run-time address for the node. This doesn't ensure global uniqueness, but it does limit the possibilities since your chances of finding two nodes with conflicting addresses are one in 268 million. This larger run-time address decreases throughput slightly, but it enhances plug-and-play capability and ease of use, while simplifying the system (since nodes come pre-configured from the factory).

Universal Context and Node Profile Object

CEBus/Generic CAL compliant nodes have, at a minimum, a Universal Context and a Node Control Object with associated instance variables (IVs). PLX deviates from the CEBus/Generic CAL defined reporting conditions and node addressing, (both of which are related to the PLX client/server architecture as opposed to the CEBus/Generic CAL peer-to-peer architecture. Thus, PLX re-defines the Universal Context/Node Control Object as the Node Profile Object with slightly different IV descriptions. Again, each PLX compliant node contains the instance variables associated with the Node Profile Object.

Each node is responsible for containing a pre-defined set of attributes that identifies, and places the node within a group of node types with commonly known attributes. The Node Profile Object information for each node is preferably hard-coded into non-volatile memory in the node. The information is sent to the server upon request. A Node Profile Object is made up of a list of instance variables. Each PLX node contains, at least, a Universal Context (0×00), a Node Profile Object (0×01) and the specified instance variables (IV) shown in Table A5 below (where R/W indicates read/write).

TABLE A5

| IV | R/W | Type | Name | Description |
|---|---|---|---|---|
| o | R/W | d | context_list | Contains a list of all contexts supported by this particular node |
| w | R/W | b | Power | Controls the global power to this specific node |
| s | R | d | serial_number | Contains a manufacturer assigned product serial number the least significant 8 bytes of which is also the devices GUID (Globally Unique Identification) (18 bytes) |
| n | R | c | manufacturer_name | Manufacturer specific name (18 byte MAX) |
| m | R | c | manufacturer_model | Manufacturer specific model (18 byte MAX) |
| c | R | n | product_class | As per the Generic CAL specification (2 ASCII bytes) |
| v | R | c | conformance_level | String identifying the current level of this particular devices CAL/PLX support. (4 ASCII bytes) |
| h | R/W | d | area_address | Used for routing and network identification purposes (1 byte). This IV is always globally READABLE (along with the network_name). |
| a | R/W | d | unit_address | Node ID used for directly addressed packets (4 bytes) |
| t | R | d | network_class | Defines the network class of the device and will be used to overwrite the most significant nibble of the devices MAC address to prioritize token disbursement. Below are the priorities and associated values in relation to network type: 0x01 Video System I 0x02 Video System II 0x03 Audio System I 0x04 Audio System II 0x05 Reserved 0x06 Security System 0x07 Utility Monitoring System 0x08 HVAC System 0x09 Lighting System 0x0a Appliance System 0x0b Data Networking System 0x0c Reserved 0x0d Reserved 0x0e Reserved 0x0f Global System |
| f | R | d | Buffering | Size of the receive buffer in bytes. |
| x | R | c | product_rev | Product revision level. (4 ASCII bytes) |
| b | R/W | d | dynamic_mask | Includes some dynamic node functions that can be characterized by a single bit. Bit 0: Promiscuous Mode 1 = enabled 0 = disabled Bit 1: MAC Server 1 = MAC server 0 = not MAC server Bit 2: Rules/Database Server 1 = Database server 0 = not Database server Bit 3: Inactive/Active Device (polled/ing) 1 = Currently Active 0 = Currently Inactive |
| u | R | d | static_mask | Includes some static node functions that can be characterized by a single bit. Bit 0: Remote Winkability 1 = remote capable 0 = remote incapable Bit 1: Authentication Capable 1 = authenticatable A(requires NV Mem) 0 = not authenticatable Bit 2: Complex Method Support 1 = Complex Methods Supported |

TABLE A5-continued

| IV | R/W | Type | Name | Description |
|----|-----|------|------|-------------|
|  |  |  |  | 0 = Complex Methods Unsupported |
|  |  |  |  | Bit 3: Diffie/Hellman Max Key size |
|  |  |  |  | 1 = 812 bits |
|  |  |  |  | 0 = 256 bits |
| y | R | d | Statistics | A statistics table A of all pertinent counters kept by this node with the following format: |
|  |  |  |  | Byte 0: Table Aversion |
|  |  |  |  | Byte 1: Bit mask counter |
| r | R/W | d | Reset | Allows this node to be reset. Writing a value of 0x52 'R' to this instance variable initiates a reset function |
| I | R/W | b | Sleep | Allows the node to go on or off-line for service or manual control |
| G | R/W | d | group_address_list | A length preceded list of all group addresses supported by this node. Therefore the first 16-bit value is the number of group addresses to follow. |
| j | R/W | d | Authentication | Authentication ID value passed to the node upon configuration and initialization. |
| i |  |  |  | XOR'd cipher array used during Diffie-Hellman |
| k |  |  |  | Non-XOR'd cipher array used during Diffie-Hellman |
| g |  |  |  | Public Key |
| d |  |  |  | Public Generator Random Number |
| q | R/W | c | network_name | Allows a node to be placed within a specified secure network by the user with an understandable name. |
| e | R/W | c | product_name | Allows a node to be referenced by a logical name. |
| p | R/W | c | product_location | Allows a node to be placed within a specified location by the user with an understandable name. |
|  | R/W | d | *system_id_list | A list of all the assigned system ID's within this environments domain. |
|  | R/W | c | *last_log | Last logged event |

Table A6 below lists client IVs that are stored, managed, and maintained by the "application server" and exist within a database in the application server. Therefore, the client need not be concerned about storing or providing information regarding these IVs.

Also part of the universal context for the master case only, is a rules object (0x03) which uses the data memory object defined by CAL, as well as some unique IVs defined for our purposes. Below is a description of this particular object:

TABLE A6

| IV | R/W | Type | Name | Instance Variable Description |
|----|-----|------|------|-------------------------------|
| r | R/W | d | current_rule | Contains the active rule pointed to by the current index variable. |
| C | R/W | n | current_index | Contains the index (handle) of the rule shown in the current rule variable. |
| s | R | n | Rule_length | Contains the length of the rule shown in the current rule variable. |
| m | R | n | Maximum_index | Contains the maximum index value that can be placed within the current index variable (the minimum is always zero '0') |
| p | R/W | d | Previous_value | Contains a string of previous values for each IV mentioned within the corresponding rule. Each IV is length preceded and NULL terminated/padded. |
| I | R | n | Previous_value_length | The max length of the previous_value string. |
| n | R/W | c | Rule_name | The logical name assigned to this particular rule. Used to make the user-interface more readable. |
| z | R/W | n | Status | Contains the status of the current rule. If it is zero, then the rule is in effect, if its non- zero, one of the IV's pointed to by this rule is non-active (off line). |

The rules object allows remote nodes a method for adding (inheriting), deleting (disinheriting), and viewing (getArray) rules within the rules list.

By providing a universal context, the network is able to contain a node list. The node is able to contain a context list. The node is able to have an object list for each context. Given the object list, the node is also able to contain specific instance variables. Many of these lists are specified within the Generic CAL specification (other than the network and node lists).

When requested, a node responds with specific portions of the Node Profile shown above for its particular configuration. The Node Profile allows a means to auto-configure particular nodes that are unique within the network under consideration. Duplicate nodes can provide another level of configuration in order to be uniquely identified.

Security

Security is realized through a two-step process. Initially, each node that powers up onto the network is immediately placed within the public network. The public network is the default network assignment for all nodes, and they are visible by all other public nodes and their authentication ID is assigned to NULL. Once a node has become secure through the key-exchange process described below, its authentication ID changes to a value dictated by the encryption array. As each node is assigned to this private/secure network, they are given a 32-byte encryption array, from which they encrypt or decrypt subsequent packets. This is accomplished through a key exchange technique known as Diffie-Hellman, using a 256-bit key. Use of an efficient exponentiation algorithm reduces the time needed to compute the values used in the key exchange. Once the encryption array is stored within the memory of each node on the network, encryption and decryption are performed. In one embodiment, encryption an decryption are use a stream-ciphering technique based on an exclusive-or with feedback. Other algorithms may be used, including, for example, DES, RC4, MD5, and the like.

Additional Features

Reporting Condition Specifics

Since reporting conditions are handled differently under PLX than they are under CAL, the PLX methods for handling rules will be shown here. These changes were implemented to address many of the limitations inherent within a strict CAL reporting condition methodology. The differences are shown in Table A7 below.

TABLE A7

Advantages of PLX over Generic CAL.

| CEbus CAL | PLX |
|---|---|
| 1 rule per object | multiple rules per object |
| 1 active IV per object | multiple active IVS per object |
| simple rules only | simple and complex rules |
| rigid rules | flexible rules |

Since PLX rules exist on the server, as opposed to distributed rules under Generic CAL, PLX is more powerful in how it handles rules by virtue of its single, powerful engine. PLX client nodes each report changes in their IVs to the server. This is true of any IV change. When the server sees an IV change, the server looks at the specific object/IV combination that changed, the server looks at its list of rules, and the server tests each rule for validity. Therefore, each object is configured to contain the following two IVs, which handle each of the rules created for the specified object and associated IVs as listed below.

| IV | R/W | Type | Name | Context Function |
|---|---|---|---|---|
| R | R/W | d | rules_array | Contains an array of pointers of indices into the masters rules list (rules object). Each entry signifies a complete rule to be tested when an IV within this object is modified. |
| P | R/W | n | number_of_rules | Contains the number rules within the rules_array. |

The actual report_header, and report_address, report_condition and previous_value variables are each kept within the rule pointed to by the array. The calling routine simply passes this pointer (or index) to the rules engine, and the rules engine will parse the appropriate information it needs from the masters rules list.

Non-Volatile Memory Usage

Each node contains the Node Profile information in a static memory location such as ROM. Additionally, nodes may store other information such as the authentication key in non-volatile memory, however, this is an option, and is not required of any PLX compliant node. Other optional memory requirements include routing information and other dynamic tables.

Client Change Notification

Client nodes typically report a state change condition to the application server node. This means, that even if the application server tells a client to change its state, the client reports back to the application server that its state has changed. This reduces the chance of problems wherein the application server database is not synchronized with the actual client nodes' variable(s).

This is desirable since the application server contains the reporting conditions and rules associated with client variable changes. The clients are less intelligent in this regard, and so they should notify the application server of appropriate changes.

The application server typically does not update its database variables pertaining to a specific client node, until after receiving validation from that client node, notifying the "application server" that the client has changed state.

What is claimed is:

1. A computer network gateway, comprising:
an internal node database comprising information about nodes on a network;
a protocol converter configured to allow the nodes on the computer network to communicate using one or more data protocols according to information in said node database, wherein said one or more data protocols are transmitted over a network medium using a medium protocol;
an application programming interface to communicate with said nodes;
a software module configured to provide an active mode and a standby mode, said active mode configured to maintain said internal node database and to provide access to said node database, said standby mode configured to maintain said internal node database as a mirror copy of an external node database, said software module configure to transition to an active mode when an unacknowledged client node request for access to said network medium is detected, in said active mode, said gateway configured to translate packets from a first network protocol to a second network protocol.

2. The gateway of claim 1, said internal node database further comprising rules that specify actions to be taken upon a state change of a client node.

3. The gateway of claim 2, wherein said rules are simple rules.

4. The gateway of claim 2, wherein said rules are complex rules.

5. The gateway of claim 2, further comprising a rules engine configured to interpret said rules.

6. The gateway of claim 2, further comprising shims, said shims configured to translate rules into a rule definition language.

7. The gateway of claim 2, wherein said state change comprises a change in an instance variable of said client node.

8. The gateway of claim 1, wherein said internal node database is updated by issuing ping requests.

9. The gateway of claim 1, further configured to tunnel a first protocol through a second protocol.

10. The gateway of claim 1, wherein said network medium is a power line and said medium protocol is a power line protocol.

11. The gateway of claim 1, wherein said network medium is a power line and said medium protocol is a PLX protocol.

12. The gateway of claim 1, further comprising an event handler configured to notify a user application when a change occurs in an instance variable of said client node.

13. The gateway of claim 1, further comprising an object-oriented application programming interface.

14. The gateway of claim 1, further comprising an internet browser configured to provide a user interface to information in said internal node database.

15. The gateway of claim 14, wherein said user interface is configured to allow a user to control nodes on a power line network.

\* \* \* \* \*